(12) United States Patent
Leclerc et al.

(10) Patent No.: US 11,371,644 B2
(45) Date of Patent: Jun. 28, 2022

(54) DUAL DISPLAY STAND

(71) Applicant: Apple Inc., Cupertino, CA (US)

(72) Inventors: Michael E. Leclerc, Sunnyvale, CA (US); Brett W. Degner, Menlo Park, CA (US); Danny L. McBroom, Leander, TX (US); David H. Narajowski, San Jose, CA (US); Denis H. Endisch, Cupertino, CA (US); Kristopher P. Laurent, Campbell, CA (US); Simon J. Trivett, Waterloo (CA)

(73) Assignee: APPLE INC., Cupertino, CA (US)

( * ) Notice: Subject to any disclaimer, the term of this patent is extended or adjusted under 35 U.S.C. 154(b) by 1 day.

(21) Appl. No.: 16/572,410

(22) Filed: Sep. 16, 2019

(65) Prior Publication Data

US 2020/0378547 A1 Dec. 3, 2020

Related U.S. Application Data

(60) Provisional application No. 62/855,226, filed on May 31, 2019.

(51) Int. Cl.
*F16M 11/04* (2006.01)
*F16M 11/08* (2006.01)

(52) U.S. Cl.
CPC ......... *F16M 11/045* (2013.01); *F16M 11/046* (2013.01); *F16M 11/08* (2013.01); *F16M 2200/066* (2013.01)

(58) Field of Classification Search
CPC .... F16M 11/045; F16M 11/046; F16M 11/08; F16M 2200/066; F16M 11/043; F16M 11/24
See application file for complete search history.

(56) References Cited

U.S. PATENT DOCUMENTS

| | | | | |
|---|---|---|---|---|
| 1,876,922 A | * | 9/1932 | Hamilton | A47B 27/14 108/147 |
| 3,273,517 A | * | 9/1966 | Amthor, Jr. | A47B 27/14 108/2 |
| 3,411,367 A | * | 11/1968 | Massa | H04N 17/04 74/10.45 |
| 3,451,739 A | * | 6/1969 | Fitzgibbons | G02B 21/241 359/383 |
| 4,522,130 A | * | 6/1985 | Worthington | A47B 31/04 108/159 |

(Continued)

*Primary Examiner* — Christopher Garft
(74) *Attorney, Agent, or Firm* — Dorsey & Whitney LLP

(57) ABSTRACT

A display stand has two spaced apart legs connected by a horizontal support bar that is attachable to multiple displays. Carriage assemblies allow the stand to adjust the vertical position of the displays, shuttles and rails allow the stand to adjust the horizontal positions of the displays, and a central joint on the support bar allows the stand to adjust the angle between the displays. The carriage assemblies can convert rotational movement of adjustment handles into vertical movement of the support bar that is synchronized at both legs whether the support bar is in a straight or angled configuration. Wheels on the shuttles can provide smooth, consistent contact with rails in the support bar despite changes in the nominal dimensions of the rails. The display stand provides improved smoothness, rigidity, and comfort for the user to support and use multiple displays on a single stand.

22 Claims, 12 Drawing Sheets

(56) References Cited

U.S. PATENT DOCUMENTS

| | | | | |
|---|---|---|---|---|
| 4,615,279 A * | 10/1986 | de la Haye | A47B 9/04 | 108/147 |
| 4,619,427 A * | 10/1986 | Leymann | F16M 11/048 | 108/102 |
| 4,640,485 A * | 2/1987 | Day | F16M 11/18 | 248/183.4 |
| 5,240,215 A * | 8/1993 | Moore | A47B 5/04 | 108/10 |
| 5,405,189 A * | 4/1995 | Stumpf | A47C 7/402 | 297/353 |
| 6,119,605 A * | 9/2000 | Agee | A47B 9/02 | 108/147 |
| 6,338,523 B1 * | 1/2002 | Rasmussen | B60P 3/34 | 296/175 |
| 6,766,995 B1 * | 7/2004 | Hsieh | F16M 11/18 | 248/404 |
| 7,086,632 B2 * | 8/2006 | Hsieh | G10H 1/32 | 108/147 |
| 7,410,143 B2 * | 8/2008 | Chen | F16M 11/046 | 248/176.3 |
| 7,744,142 B2 * | 6/2010 | Rasmussen | B60P 3/42 | 296/24.3 |
| 8,035,769 B2 * | 10/2011 | Wang | F16M 11/16 | 349/58 |
| 8,267,527 B2 * | 9/2012 | Kepley, Jr. | G03B 21/58 | 353/79 |
| 8,342,462 B2 * | 1/2013 | Sapper | F16M 11/10 | 248/124.1 |
| 8,651,444 B2 * | 2/2014 | Sapper | F16M 11/105 | 248/371 |
| 9,400,083 B2 * | 7/2016 | Sapper | F16M 11/2092 | |
| 10,208,793 B2 * | 2/2019 | Wang | F16C 29/04 | |
| 10,485,340 B1 * | 11/2019 | Butler | F16M 11/10 | |
| 2005/0184547 A1 * | 8/2005 | Rasmussen | B60P 3/34 | 296/26.01 |
| 2010/0044541 A1 * | 2/2010 | Sapper | F16M 11/10 | 248/371 |
| 2014/0166950 A1 * | 6/2014 | Wiegel | B62D 53/0864 | 254/2 R |
| 2018/0369641 A1 * | 12/2018 | Saunders | A63B 23/04 | |
| 2019/0308855 A1 * | 10/2019 | Wiegel | B60D 1/665 | |

* cited by examiner

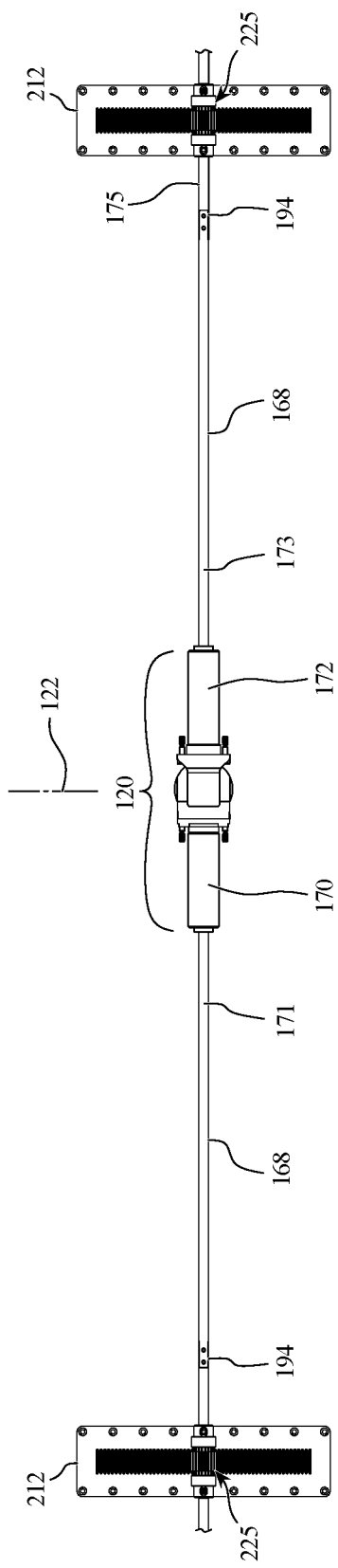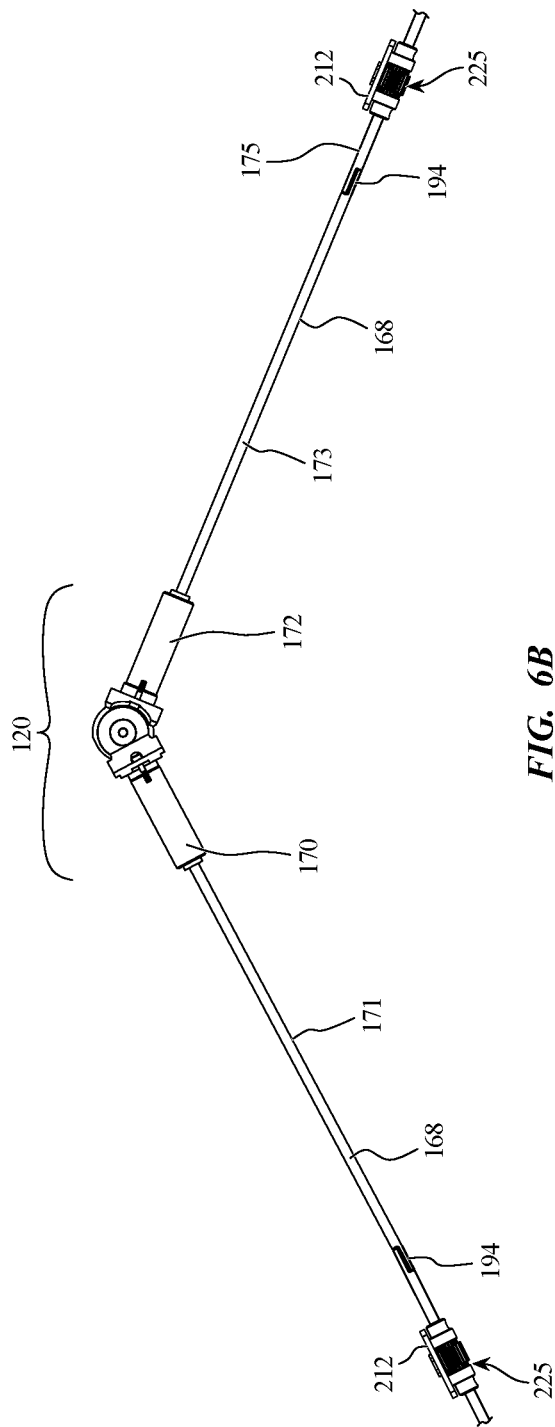
FIG. 6A
FIG. 6B

DUAL DISPLAY STAND

CROSS-REFERENCE TO RELATED APPLICATION(S)

This claims priority to U.S. Provisional Patent Application No. 62/855,226, filed 31 May 2019, and entitled "DUAL DISPLAY STAND," the entire disclosure of which is hereby incorporated by reference.

FIELD

The described embodiments relate generally to stands and supports for electronic devices. More particularly, the present embodiments relate to adjustable stands for multiple computer displays.

BACKGROUND

Computer device designers often desire to control positioning of a computer monitor or similar display at whatever height and orientation are best suited for the needs of the user. A stand can position the display to accommodate users and desktop surfaces of different heights, sizes, and postures. The stand can allow the user to adjust the monitor with little expended effort.

While various existing display stands provide tilt, rotation, and vertical height adjustment of monitors, these features often come at the expense of being convenient and natural to use. Many require the user to deal with significant friction or hysteresis that makes adjustment difficult, awkward, and time consuming. Such issues impede the stand from having a high quality, satisfying user experience. These issues are compounded when the display stand must support more than one display. There is, therefore, a constant need for improvements to stands and supports for electronic devices.

SUMMARY

Aspects of the present disclosure can relate to a display support assembly comprising a first stand leg, a first carriage assembly positioned the first stand leg, a second stand leg, a second carriage assembly positioned the second stand leg, a display support bar connected to the first carriage assembly and to the second carriage assembly, with the display support bar extending from a first vertical position on the first stand leg to a second vertical position on the second stand leg, and a carriage adjuster to simultaneously adjust the first and second vertical positions of the display support bar relative to the first and second stand legs by adjusting the first carriage assembly and the second carriage assembly.

In some embodiments, the display support assembly further can comprise a display support arm mounted to the display support bar at a mounting position relative to the first stand leg, wherein the mounting position can be adjustable relative to the first stand leg in a vertical direction, in a horizontal direction, and about a vertical axis of rotation. The carriage adjuster can be rotatable about a longitudinal axis of the display support bar or can be positioned at an end of the display support bar. The carriage adjuster can comprise a first carriage adjuster positioned at a first end of the display support bar and a second carriage adjuster positioned at a second end of the display support bar. The first carriage assembly can comprise a rack and pinion adjustable by the carriage adjuster. A support arm can extend from the display support bar, and a shuttle can be movable along an axis of the display support bar, with the support arm being movable with the shuttle. A rotatable shaft can be linked to the carriage adjuster, with the rotatable shaft extending through the shuttle. The display support bar can comprise a first rail surface and a second rail surface, and the shuttle can comprise a set of wheels in contact with the first and second rail surfaces. The display support bar can also comprise a first portion, a second portion, and a pivotable joint joining the first and second portions. A universal joint can be positioned in the pivotable joint.

Another aspect of the disclosure relates to a display support assembly comprising a first rail having a V-shaped profile, a second rail having a V-shaped profile, with the second rail being parallel to the first rail, and a slide having a display support portion, with the slide having a set of rollers in contact with the first rail and the second rail. Contact between the set of rollers and the first and second rails can constrain movement of the slide to a single principal plane of motion, and the single principal plane of motion can intersect the first and second rails.

In some embodiments, the slide can comprise a body, and the set of rollers can comprise at least one roller biased into contact with the first rail or the second rail relative to the body. The set of rollers can comprise at least one roller unbiased relative to the body. The slide can comprise a body and the set of rollers can comprise a first pair of rollers at a first end of the body, a second pair of rollers at a second end of the body, and a third pair of rollers positioned between the first and second ends. The first and second rails can be positioned within a hollow elongated structure, and the slide can be movable within the hollow elongated structure parallel to the first and second rails. The first and second rails can be vertically aligned with each other, and the slide can comprise a body having a longitudinal aperture.

Yet another aspect of the disclosure relates to a display stand comprising a vertical support base, a support bar vertically movable relative to the vertical support base, with the support bar being configured to mount to a display, and a handle to adjust a position of the support bar relative to the vertical support base between two extreme raised and lowered positions, with the handle having a slip clutch. When the support bar is positioned between the two extreme raised and lowered positions, rotation of the handle can raise or lower the support bar relative to the vertical support, and when the support bar is positioned at one of the two extreme raised and lowered positions, rotation of the handle can slip the clutch.

The handle can be coaxial with the support bar. The slip clutch can slip upon application of a torque to the handle exceeding a predetermined maximum torque. The slip clutch can comprise a rotor contacted by a biased pressure plate.

In some embodiments, the support bar can comprise an adjustment shaft, wherein rotation of the adjustment shaft can adjust the position of the support bar between the two extreme raised and lowered positions. The handle can comprise a friction engine coupled with the adjustment shaft, with the friction engine applying a first amount of friction to the adjustment shaft as the handle adjusts the position of the support bar in an upward direction and applying a second amount of friction to the adjustment shaft as the handle adjusts the position of the support bar in a downward direction. The first amount of friction can be less than the second amount of friction.

In some configurations, rotation of the handle can adjust a pinion relative to a rack. The pinion can comprise a shoulder surface having a diameter equal to a pitch diameter of the pinion and rack.

BRIEF DESCRIPTION OF THE DRAWINGS

The disclosure will be readily understood by the following detailed description in conjunction with the accompanying drawings, wherein like reference numerals designate like structural elements, and in which:

FIG. 6A is a rear view of a linking rod, a joint, and a set of racks and pinions in a drivetrain of the display stand in a straight configuration.

FIG. 6B is a top view of the drivetrain of FIG. 6A in an angled configuration.

DETAILED DESCRIPTION

Figure 1:
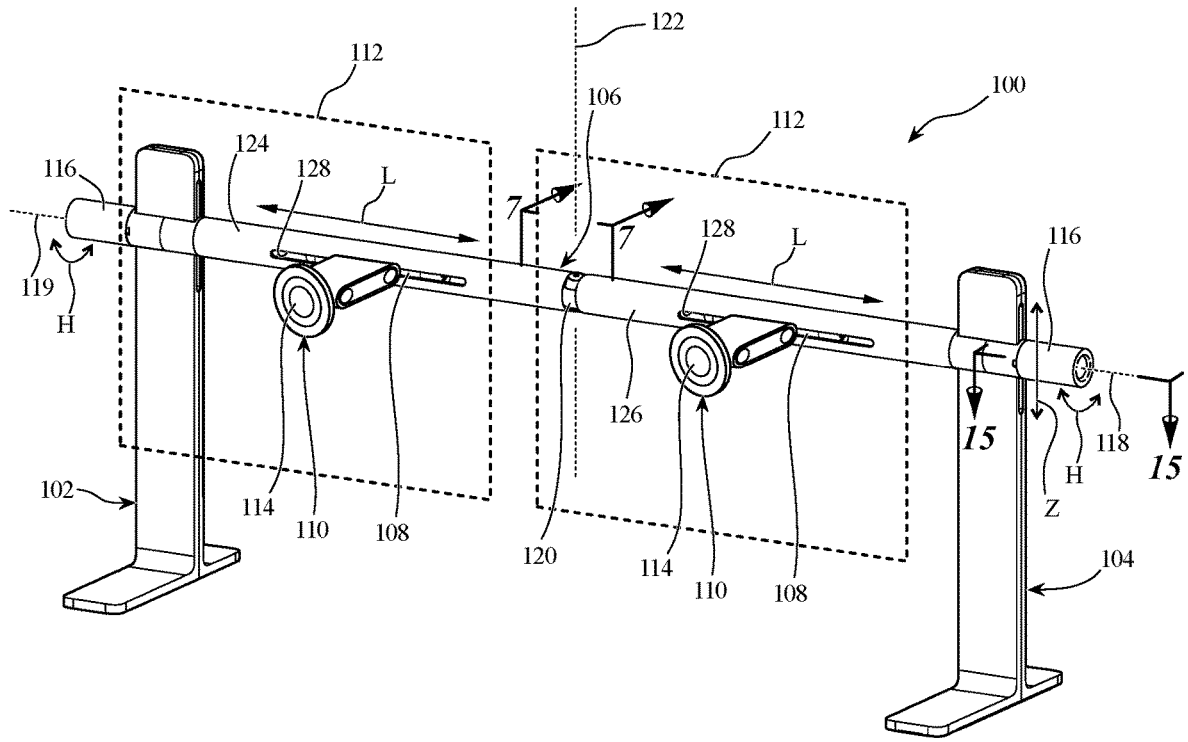
FIG. 1 shows an isometric view of a display stand in a straight configuration.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to embodiments of a support stand for multiple displays. When users use multiple displays in a workspace, the displays are generally supported by multiple different individual stands or by independently-movable arms that extend from a single support point. These individual stands or arms unnecessarily take up large spaces, are often aesthetically unpleasing, overcomplicated, and have inefficient redundant mechanisms. When multiple displays are used on independent arms, they can be difficult to align in a smooth and precise way due to inconsistent counterbalancing and arm lengths. When multiple displays are used on a single support, they cannot be effectively adjusted relative to each other about a vertical axis.

Aspects of the present disclosure relate to features of a display stand for providing vertical, horizontal, and center pivot degrees of freedom for multiple displays. The stand can have two legs spaced at end portions of the stand (e.g., farther apart than the mounting points of the outermost displays) that are linked by a substantially horizontal support bar. The support bar can be vertically adjustable relative to the legs by synchronized adjustment of carriage assemblies associated with each of the legs. The legs can be referred to as vertical supports or vertical support bases. The vertical position of the support bar can be simultaneously adjusted relative to each of the legs due to a linking rod extending across the length of the support bar. The linking rod can be referred to as a linking shaft or a rotatable shaft. The carriage assemblies can have rack-and-pinion features that are connected to each other by the linking rod, wherein rotation of the linking rod induces equal vertical displacement of the support bar at each leg. The rack-and-pinion features can comprise contact surfaces configured to control their spacing to remain at a pitch diameter of the mesh at all times, thereby ensuring even movement at both ends of the display stand and minimized tooth slippage or binding at the rack and pinion.

The horizontal support bar can include an internal space in which shuttle devices are positioned, and the shuttles can be coupled to display support arms extending laterally from the display stand. The support bar can therefore be referred to as a hollow elongated structure with an internal passage for the shuttles, hollow structure being elongated in a generally horizontal direction when the support bar is in an orientation of intended use. The shuttles can be horizontally movable relative to the support bar by using rollers or wheels that ride upon rails through the horizontal support bar. The rollers can constrain the movement of the shuttle devices along two principal planes of motion and can tolerate high moment loads about their moving axis/the longitudinal axis of the support bar. Thus, the rollers can limit movement of the shuttle devices to stay within a single principal plane of motion or to be biased to travel along a single primary axis (e.g., the longitudinal axis of the support bar).

The rollers can be arranged on the shuttle devices in a crossing-axis arrangement with pairs of roller wheels being spaced along the length of the shuttle to prevent twisting or turning of the shuttle caused by the weight of an attached display or caused by movement of the shuttle along the rails. At least one of the rollers can be biased into contact with the rail so that the shuttle stays in contact with the rails even if the shape or straightness of the rails vary along the support bar. The rails can have V-shaped profiles to help support the weight of the support arm and display without roller slippage or unnecessarily large biasing forces on the biased roller.

The support bar can also be pivotable about a vertical axis positioned between the support legs. In other words, a first portion or segment of the support bar can be pivoted relative to a second portion or segment thereof. The joint can be referred to as a support bar joint and can be a single-pivot joint. The linking rod for vertical adjustment of the support bar can extend through the support bar joint. Segments or portions of the linking rod can be joined to each other within the single-pivot joint by a universal joint that synchronizes rotation of one segment of the linking rod (e.g., a segment in the first portion of the support bar) with another segment (e.g., a segment in the second portion of the support bar).

A rotatable handle can be positioned at each end of the support bar, wherein rotation of the handle can adjust the support bar upward and downward along the carriage assemblies. Thus, the handle can be referred to as a carriage adjuster or a rotatable vertical position adjuster for the support bar. The handle can be connected to the linking rod and can rotate the pinion (and the linking rod attached to the pinion) relative to the rack in order to move the carriage assemblies. In some embodiments, the handle can include a slip clutch to limit or prevent over-torqueing the handle and linking rod. The slip clutch can comprise a friction-based rotor and biased plate assembly. The handle can also include a friction engine to help balance input torque required for upward or downward adjustment of the support bar. The friction engine can vary its application of friction based on whether the support bar 106 is moving upward, downward, or is static.

These and other embodiments are discussed below with reference to the figures. Those skilled in the art will readily appreciate that the detailed description given herein with respect to these figures is for explanatory purposes only and should not be construed as limiting. Features from one embodiment can be implemented in other embodiments.

Figure 2:
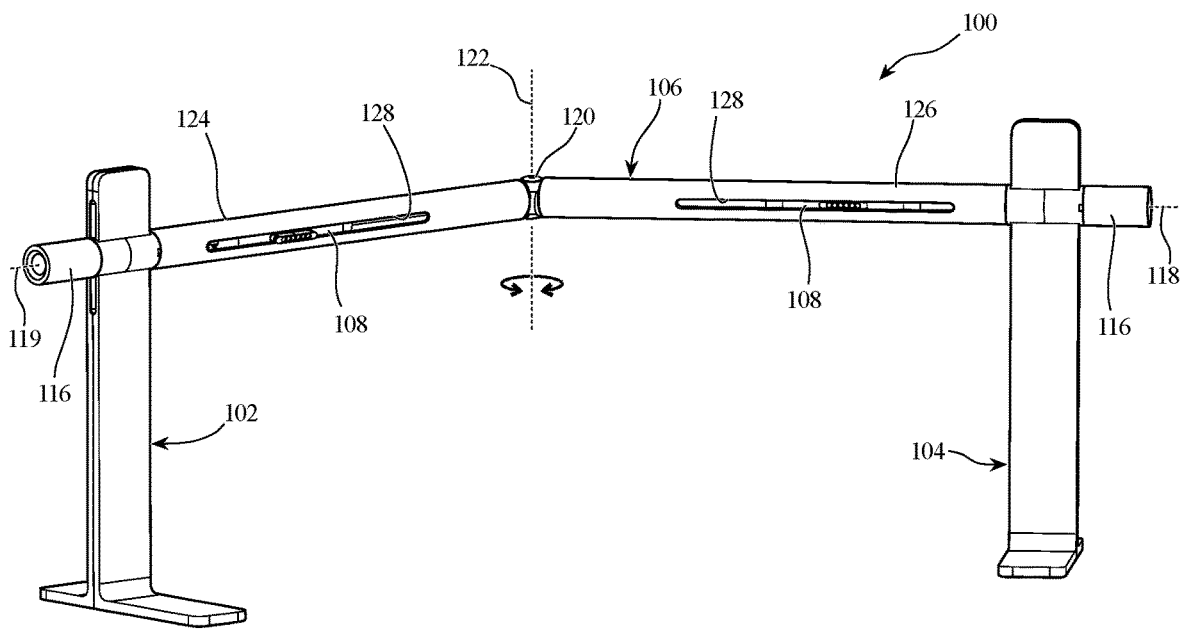
FIG. 2 shows an isometric view of the display stand of FIG. 1 in an angled configuration.

FIG. 1 shows an isometric view of a display stand 100 according to an embodiment of the present disclosure. The display stand 100 can have a first leg 102 and a second leg 104 that extend at least partially upward and that are linked by a support bar 106 extending horizontally from leg to leg. FIG. 2 shows another isometric view of the display stand 100 with the support bar 106 in a pivoted or angled configuration relative to the straight or linear position of the support bar 106 shown in FIG. 1. As shown in the breakaway isometric view of FIG. 3, the support bar 106 can contain movable shuttles 108. FIG. 1 shows support arms 110 that extend away from the shuttles 108 of support bar 106 to connect to a pair of separate displays 112.

The display stand 100 can thereby provide support for one or more displays 112. The displays 112 are shown in diagrammatic broken lines in the figures to show features of the display stand 100 that would otherwise be hidden behind the displays 112. Each display 112 can comprise an electronic display such as a monitor or similar visual output device for displaying information in pictorial form. A display 112 can comprise a display device (e.g., a thin film transistor liquid crystal display (TFT-LCD) with light-emitting diode (LED) or cold-cathode fluorescent lamp (CCFL) backlighting or an organic light-emitting diode (OLED) display), circuitry, a housing or casing, and a power supply. The display 112 can be configured to connect to a computer using connectors and ports such as a video graphics array (VGA) connector, digital visual interface (DVI) connector, DISPLAYPORT® connector, THUNDERBOLT® connector, wireless electrical communications interfaces, or other related or similar electrical interfaces.

The display 112 can comprise a front-facing surface configured to face and display viewable information to the user. The viewable display area of the display 112 can be viewed through or at the front-facing surface. Thus, the front-facing surface can be referred to as a viewing surface. The front-facing surface can be substantially planar and flat, or it can be curved (e.g., cylindrically concave or convex). The display 112 can comprise a rear-facing surface configured to face away from the user. A support arm 110 can be positioned between the rear-facing surface and the support bar 106 or a shuttle 108. The support arm 110 can be releasably coupled to the display 112 at the rear-facing surface or in a rear side portion of the display 112. A mounting portion 114 of the support arm 110 can connect the display 112 to the support arm 110. See FIG. 1.

The display stand 100 can adjust each display 112 in multiple different ways. By axially rotating one of the handles 116 positioned at the ends of the support bar 106, the support bar 106 can be moved vertically upward or downward relative to a support surface on which the first and second legs 102, 104 are resting. In other words, the longitudinal axes 118, 119 of the support bar 106 can be moved along the Z-axis (i.e., in a Z-direction or a height adjustment direction) shown in FIG. 1 when the handles 116 are rotated (e.g., as indicated by arrows H). Movement of the support bar 106 can also move the shuttles 108, support arms 110, and displays 112 that are supported by the support bar 106, so that vertical movement of the support bar 106 can vertically move components supported by it.

The support bar 106 can comprise a joint 120 positioned between the first and second legs 102, 104. Pivoting the support bar 106 at the joint 120, such as, for example, by moving one of the first and second legs 102, 104 relative to the other leg, the display stand 100 can rotate one display 112 relative to the other about a pivot axis 122 that extends vertically through the joint 120 and that is parallel to the Z-axis. FIG. 1 shows a configuration wherein the support bar 106 has a first segment 124 and a second segment 126 aligned along their respective longitudinal axes 118, 119, and FIG. 2 shows a configuration wherein the segments 124, 126 have respective longitudinal axes 118, 119 that are positioned at a non-zero angle and are not coaxial with each other due to pivoting of the segments 124, 126 about the pivot axis 122. Pivoting the support bar 106 can be useful to position the displays 112 at an angle relative to each other (i.e., relative to the pivot axis 122) and to keep the lateral outer ends of the displays 112 at a substantially similar viewing distance from the user as compared to the lateral inner ends thereof. In this way, the widths of large side-by-side displays 112 can remain within a minimized range of focal distances from the user as compared to side-by-side displays 112 with viewing surfaces that are aligned in a plane in front of a user. Additionally, pivoting the support bar 106 can help fit the display stand 100 on corner desks or on otherwise curved or angled support surfaces.

The shuttles 108 can be movable along the longitudinal axes 118, 119 of their respective segments 124, 126 of the support bar 106. For example, the shuttles 108 can move within the support bar 106 along axes parallel to arrows L in FIG. 1. The shuttles 108 can therefore be referred to as being laterally displaceable along horizontal axes 118 and 119. The shuttles 108 can be referred to as slides, carts, or lateral adjustment assemblies. The support arms 110 can move with the shuttles 108, thereby allowing the displays 112 to move laterally as well. Thus, the displays 112 can be laterally moved nearer toward or farther away from each other as the shuttles 108 are moved within the support bar 106. In this manner, the displays 112 can be spaced apart to make room between each other (e.g., to serve two different nearby users) or can be approximated to make the workspaces of the displays 112 appear closer to each other and more seamless for a user.

The support bar 106 can comprise a generally tubular shape extending from a first end positioned at and around the first leg 102 to a second end positioned at and around the second leg 104. The joint 120 can be positioned at a midpoint or center of the support bar 106. In some embodiments, the joint 120 can be positioned off-center, such as nearer to one leg 102, 104 than the other or nearer to one end of the support bar 106 than another. The support bar 106 can include lateral slots 128 through which the shuttles 108 can be seen or through which the support arms 110 are connected to the shuttles 108. The lateral slots 128 can be referred to as longitudinal slots since they can extend parallel to the longitudinal axes 118, 119. The lateral slots 128 can extend along a portion of each segment 124, 126, and the lengths of the slots 128 can correspond to the maximum range of the support arms 110 relative to the support bar 106. In other words, the support arms 110 can contact the terminal ends of the lateral slots 128 at the ends of their range of lateral movement. In some embodiments, the shuttles 108 within the support bar 106 prevent the support arms 110 from reaching contact with the ends of the lateral slots 128.

Figure 3:
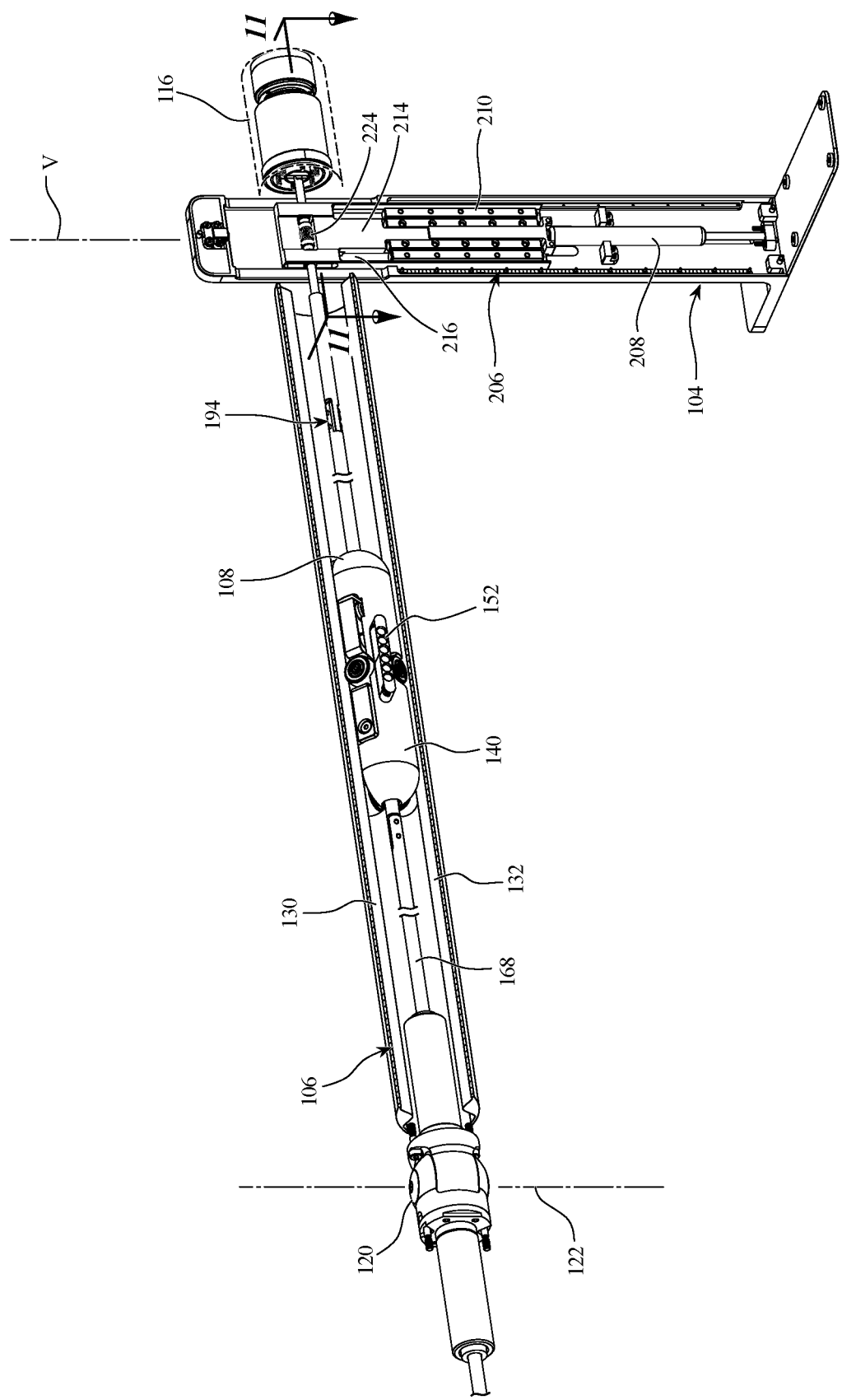
FIG. 3 shows an isometric breakaway view of an end portion of the display stand of FIG. 1.
Figure 4:
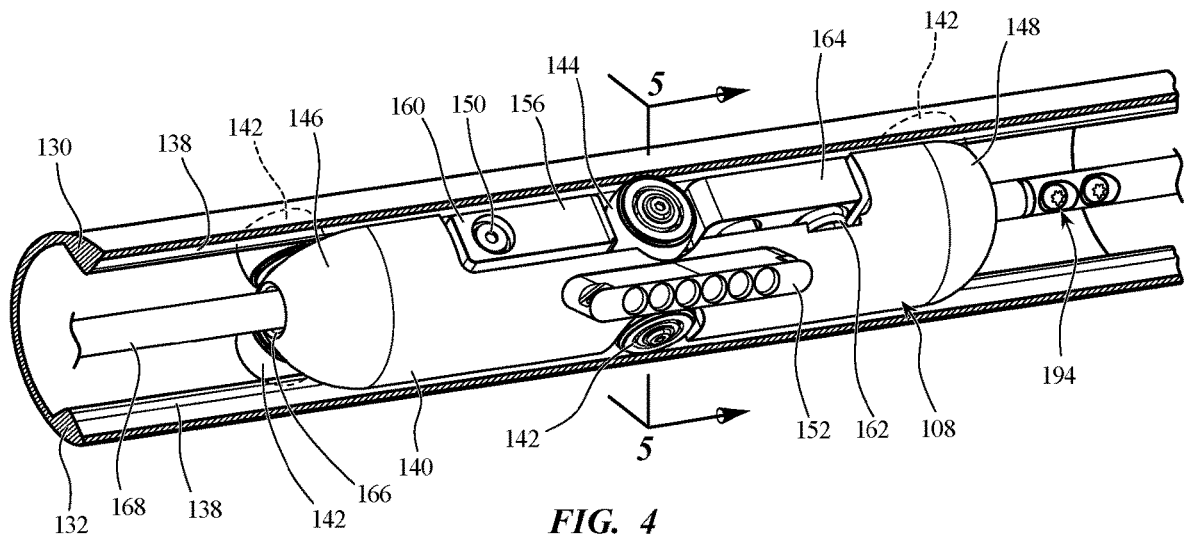
FIG. 4 shows an isometric breakaway view of a shuttle in a support bar.
Figure 5:
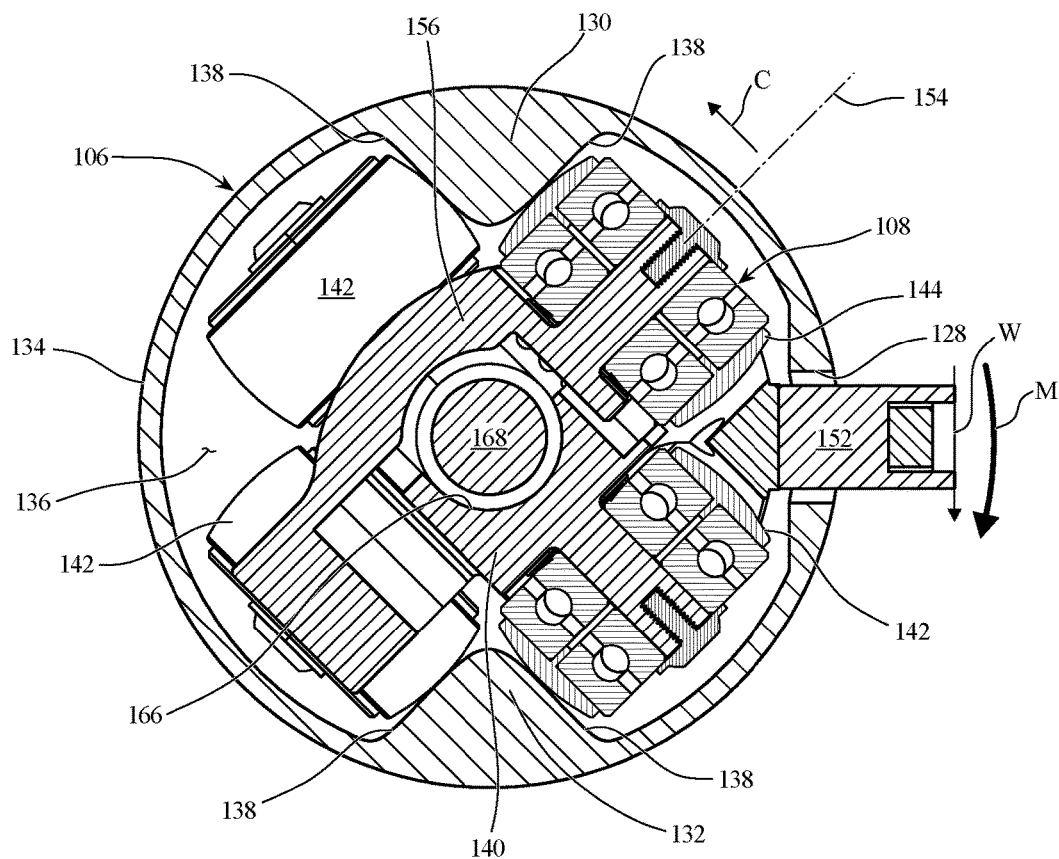
FIG. 5 shows an end section view taken through section lines 5-5 in FIG. 4.

With reference to FIGS. 3-5, the support bar 106 is shown having a top rail 130 and a bottom rail 132. FIGS. 3 and 4 show the support bar 106 with portions of its tubular body 134 removed to show internal detail of the rails 130, 132 and shuttle 108. FIG. 5 is a cross-section of the support bar 106 taken through the center of the shuttle 108 at section lines 5-5 in FIG. 4.

The top and bottom rails 130, 132 can be integrally formed with the tubular body 134 of the support bar 106. See FIG. 5. The lateral slots 128 can be formed longitudinally along the tubular body 134. The tubular body 134 can have a longitudinally-oriented internal void 136 extending along the rails 130, 132 and in which the shuttle 108 moves. See FIG. 5. The support bar 106 can be oriented with the rails 130, 132 positioned at the vertical top and bottom of the internal void 136 (i.e., aligned with a vertical axis through the support bar 106 that is perpendicular to a horizontal plane through the lateral slots 128). The rails 130, 132 can therefore be respectively positioned at "12-o'clock" and "6-o'clock" positions within the support bar 106. The purposes for the positioning of the rails 130, 132 is explained in further detail below.

As shown in FIG. 5, the rails 130, 132 can each have a generally V-shaped cross-sectional profile, wherein the V-shaped profile of the top rail 130 is pointed downward and the V-shaped profile of the bottom rail 132 is pointed upward, or wherein each profile points radially inward or toward the longitudinal axis of the support bar 106. Thus, each of the rails 130, 132 can comprise at least two shuttle contact surfaces 138 facing in different directions. In some embodiments, the contact surfaces 138 are oriented about 90 degrees offset relative to each other, and in some embodiments, they are oriented about 120 degrees offset. The shuttle contact surfaces 138 can each be substantially planar along the length of the support bar 106 and can be referred to as roller surfaces, roller contact surfaces, or wheel contact surfaces.

A shuttle 108 can comprise a shuttle body 140 on which five static wheels 142 and one biased wheel 144 are located. See FIGS. 4-5. The wheels 142, 144 can also be referred to as rollers, drums, disks, or turnable/turning contact members. The biased wheel 144 can also be referred to as a compliant wheel, compliant roller, or a wheel on a compliant member. The wheels 142, 144 can comprise generally cylindrical members configured to rotate about a longitudinal axis of the cylinder shape, balls (e.g., ball bearings), or other rollable or turnable structures that minimize friction or primarily apply rolling friction between the shuttle body 140 and the rails 130, 132. In some embodiments, the wheels 142, 144 can have a diameter of about 18 millimeters, thereby making the rolling movement of the shuttle 108 resistant to small debris, dust, sticky residues, and related substances as compared to wheels or ball bearings with about 3 millimeter diameters (or similar). The wheels 142, 144 shown in FIG. 5 are shown with curved surfaces configured to contact the contact surfaces 138. In some embodiments, the surfaces of the wheels 142, 144 configured to contact the contact surfaces 138 are cylindrical and therefore have a constant, "flat" radius from their axes of rotation across their width. The surfaces of the wheels 142, 144 can comprise plastic or another non-marking, durable material. In some embodiments, the biased wheel 144 can comprise a compressible or elastic material configured to help ensure constant contact between the wheel 144 and its contact surface 138.

Two of the static wheels 142 can be positioned at a first end 146 (see FIG. 4) of the shuttle body 140, two other static wheels 142 can be positioned at a second, opposite end 148 (see FIG. 4) of the shuttle body 140, and one other static wheel 142 can be positioned at a center of the shuttle body 140 underneath the biased wheel 144. The static wheels 142 can have individual axes of rotation that are stationary relative to the shuttle body 140. The two static wheels 142 at the first end 146 can have axes of rotation that intersect (e.g., perpendicularly intersect) at the first end 146 (e.g., at axis 118), and the two static wheels 142 at the second end 148 have axes of rotation that intersect (e.g., perpendicularly intersect) at the second end 148 (e.g., at axis 118). In some embodiments, the intersections of these pairs of axes of rotation can be centered in the respective centers of the first and second ends 146, 148.

The upper static wheels 142 (i.e., one at each of the first and second ends 146, 148) and the lower center static wheel 142 (below the biased wheel 144) can be configured to primarily bear the weight of the display 112 and support arm 110. Those wheels 142 are urged into contact with the shuttle contact surfaces 138 when a moment M (see FIG. 5) is applied to the shuttle 108 by the weight W of the display 112 and support arm 110 via an arm link 152 attached to the shuttle body 140. The other two static wheels 142 can contact the rails 130, 132 as a result of the weight W (see FIG. 5) of the support arm 110 and display 112 acting on the arm link 152, thereby driving it downward, and as a result of a biasing force applied to the biased wheel 144 that drives the biased wheel 144 in direction C, which is directed at an about 45-degree angle upward relative to a horizontal plane and which is perpendicular to its axis of rotation 154 (see FIG. 5).

The biased wheel 144 can be biased along a direction perpendicular to its axis of rotation, such as in direction C in FIG. 5. Thus, the outer surface of the biased wheel 144 can be biased into contact with a shuttle contact surface 138 of the top rail 130. The force applied by the biased wheel 144 to the shuttle contact surface 138 of the top rail 130 can also urge the lower static wheels 142 at the ends 146, 148 into contact with the shuttle contact surface 138.

As shown in FIG. 4, the biased wheel 144 can be mounted to a biased bar 156 that is pivotally attached to the shuttle body 140 at a pivot point 150 at a first end 160 and that is attached to an elastic device 162 at a second end 164. The elastic device 162 can be a spring, elastomeric block, or similar structure configured to resiliently apply a force against the second end 164 that causes the second end 164 to be biased to rotate about an axis of rotation extending through the pivot point 150. The pivot point 150 can comprise a fastener (e.g., a bolt or similar structure) having a longitudinal axis coinciding with the axis of rotation of the biased bar 156. The biased bar 156 has the biased wheel 144 positioned along its length and accordingly moves the biased wheel 144 into the rail 130 when the second end 164 moves relative to the first end 160. The biased bar 156 can have the elastic device 162 positioned further from the pivot point 150 than the biased wheel 144 in order to provide leverage and to magnify the force applied by the wheel 144 to the rail 130 as a result of the force applied by the elastic device 162.

As the shuttle 108 moves along the rails 130, 132, the rails 130, 132 can have variation in their straightness, their relative positioning (e.g., they are not precisely parallel), the thickness between their contact surfaces 138, and other types of variation within tolerances and nominal dimensions. Additionally, parts of the shuttle 108 can have variation, such as the size and relative positioning of the wheels 142, 144. A shuttle 108 having all-static wheels would therefore not consistently roll with all six wheels 142, 144 in contact with the rails 130, 132 because the variation of the shuttle 108 and rails 130, 132 would have some wheels separated at certain points along the support bar 106.

The bottom rail 132 being below the three bottom static wheels 142 (that are arranged with 90-degree offset axes (as shown in FIG. 5)) ensures that gravity pulls those wheels 142 of the shuttle 108 into contact with both of the contact surfaces 138. The biased wheel 144 applies a force to the contact surface 138 of the top rail 130 that makes the top two static wheels 142 also each contact a contact surface 138 of the top rail 130. If there is variation in the rails 130, 132, the biased wheel 144 can enable the shuttle 108 to accommodate for those changes by the biased wheel 144 rotating its axis of rotation about the longitudinal axis 118 to positions closer or farther from the position of axis 154 in FIG. 5 as the shuttle 108 moves along the longitudinal axis. If the biased wheel 144 rotates, the other static wheels 142 can also stay in contact with the contact surfaces 138 due to the rest of the shuttle 108 rotating or being pulled down by gravity and by the weight W and moment M at the arm link 152.

The top-and-bottom configuration of the top and bottom rails 130, 132 relative to the internal void 136 and tubular body 134 can also be beneficial in keeping the shuttle 108 on the rails 130, 132 while the weight W or moment M of the support arm 110 and display 112 are applied to the arm link 152. The static wheels 142 on the bottom sides of the ends 146, 148 support the weight W when the arm link 152 is loaded. If the rails 130, 132 and shuttle 108 were positioned 45-degrees offset from the positions shown in FIG. 5, such as in a configuration wherein top rail 130 would be centrally aligned with the position shown for axis of rotation 154, the bottom static wheels 142 at the ends 146, 148 would have horizontal axes of rotation and would have a tendency to slide relative to the contact surfaces 138, especially if a moment about a vertical axis were applied to one end 146 to rotate that end 146 relative to the opposite end 148. The biased wheel 144 would have to be very strongly biased in order to prevent movement or rotation of the shuttle 108 on the rails in that case, and a strong elastic device 162 would inefficiently take up more space and weight in the shuttle 108. However, if the same moment about a vertical axis were applied to the embodiment as shown in FIG. 5, the shuttle 108 is more stable and rigid because none of the wheels 142, 144 have horizontal axes (i.e., axes perpendicular to the axis about which the moment is applied). The wheels 142, 144 can therefore be less susceptible to slipping on the contact surfaces 138. As a result, the elastic device 162 does not need to be as forceful in order to keep the shuttle 108 properly positioned in the support bar 106.

The shuttles 108 can also comprise an inner channel 166. The inner channel 166 can extend longitudinally through the entire length of the shuttle body 140 and can have a diameter (or a width, if it is not circular in profile) larger than the diameter (or width) of linking rod 168. The inner channel 166 can also be referred to as a longitudinal channel, a longitudinal passage, or a rod-receiving aperture. The shuttles 108 can therefore have a hollow interior channel and can translate along the length of the linking rod 168 without contacting the linking rod 168. For this reason, the linking rod 168 can axially rotate while extending through a shuttle 108 without causing the shuttle 108 to also rotate. In other words, the rotation of the linking rod 168 can be independent of the shuttle 108. The linking rod 168 can be used to adjust the height of the support bar 106, as explained in further detail elsewhere herein.

The support arms 110 can extend from the arm links 152 on each shuttle 108. The support arms 110 can be pivotable relative to the shuttles 108, wherein each support arm 110 can be rotated about a pivot axis through the support arm 110 that is parallel to the longitudinal axis 118/119 of the shuttle 108 to which it is connected. In this manner, the vertical position of one display 112 can be adjusted independent of the other display 112. This vertical position adjustment can differ from the vertical adjustment of the support bar 106 by way of the handles 116 because each display 112 is adjusted independently rather than all displays and the support bar 106 being simultaneously vertically moved. The support arms 110 can move longitudinally parallel to the longitudinal axis 118/119 of the individual segment 124, 126 they extend from. The support arms 110 can also comprise mounting portions 114 or other connectors configured to attach the displays 112 to the support arms 110. A mounting portion 114 can be rotatable relative to the rest of the support arm 110 to which it is attached in order to provide tilting of the display 112 relative to the support arm 110 (i.e., rotation of the display 112 about a longitudinal axis parallel to the longitudinal axis 118, 119 of the segment 124, 126 to which it is mounted).

The joint 120 can be positioned at a midpoint of the support bar 106. The joint 120 can be a single pivot joint having a single axis of rotation 122 between the two segments 124, 126. FIG. 6A shows a side view of the joint 120 with the support bar 106 removed. The joint 120 can comprise a first joint portion 170 pivotally connected to a second joint portion 172. In FIG. 6A, the joint 120 is in a fully extended or linear configuration, wherein the linking rod 168, the first and second joint portions 170, 172, and the longitudinal axes 118, 119 are coaxial with each other. This configuration is also shown in FIG. 1. FIG. 6B shows a top view of the joint 120 with the joint 120 in a pivoted or angled configuration, wherein the linking rod 168, the first and second joint portions 170, 172, and the longitudinal axes 118, 119 are angled relative to each other. In some embodiments, the range of deflection of the joint 120 can be from about 0 degrees to about 40 degrees (forward or backward).

Figure 7:
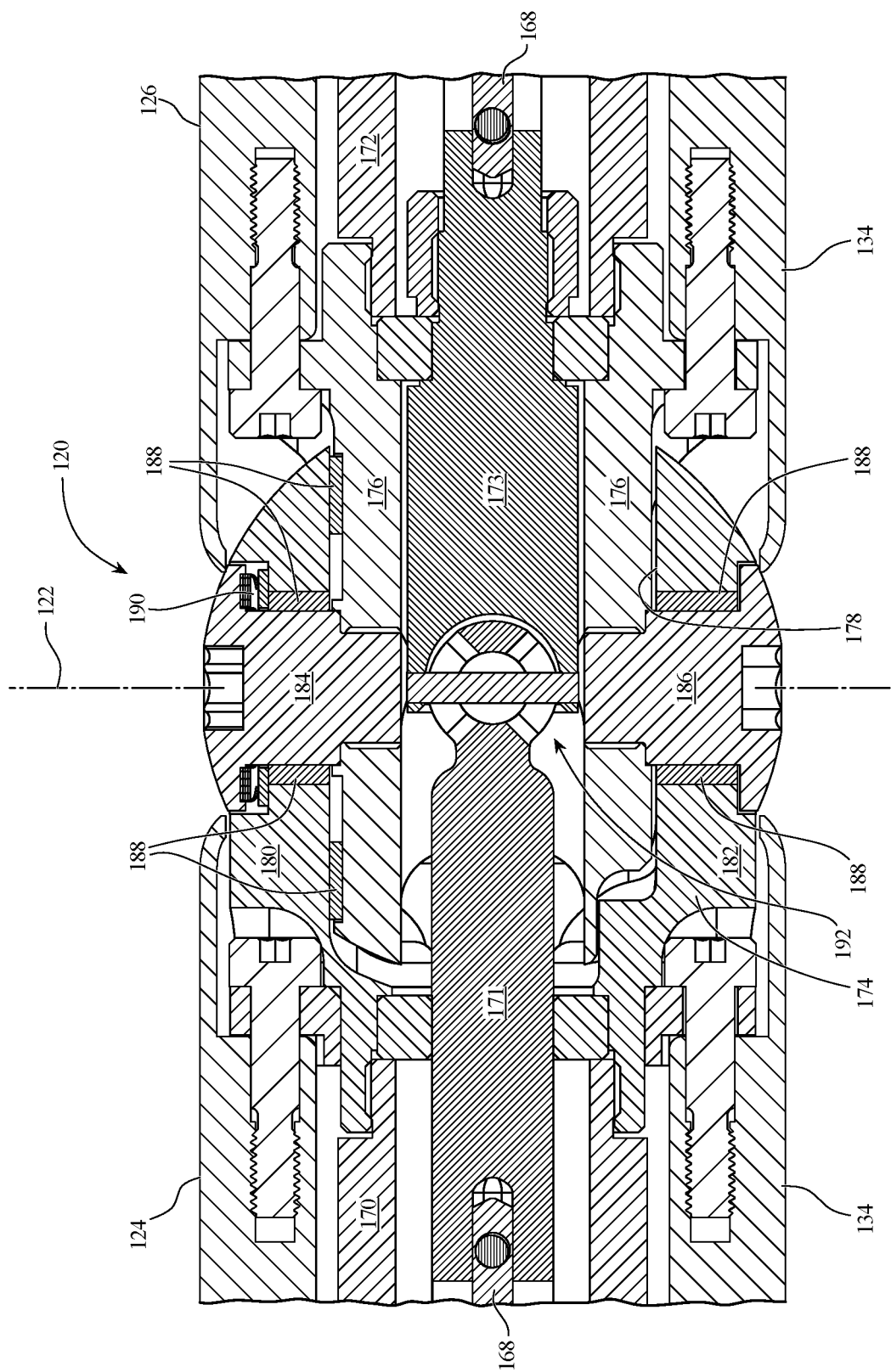
FIG. 7 is a section view of a joint as taken through section lines 7-7 in FIG. 1.
Figure 8:
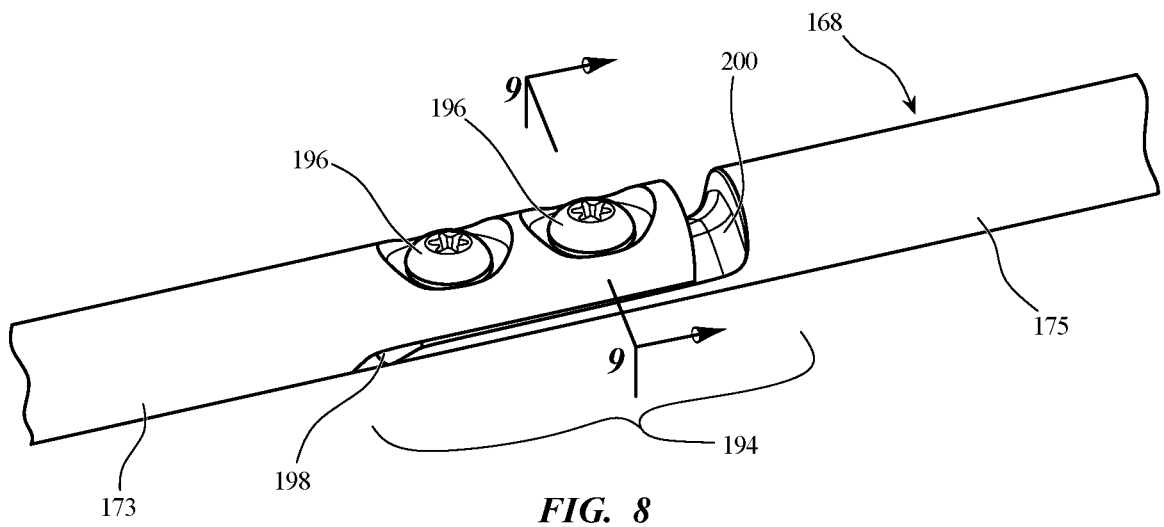
FIG. 8 is an isometric view of a shaft joint of a linking rod.

The tubular body 134 of each segment 124, 126 of the support bar 106 can be affixed to a corresponding first or second joint portion 170, 172. Accordingly, the linking rod 168 can rotate within and relative to the first and second joint portions 170, 172. FIG. 7 is a front view central cross-section of the joint 120 as taken through section lines 7-7 in FIG. 1. The linking rod 168 can have a first portion 171 within the first segment 124 and within the first joint portion 170 and can have a second portion 173 within the second segment 126 and within the second joint portion 172. The tubular body 134 of each segment 124, 126 can be concentric with its respective joint portion 170, 172 and with its respective portion of the linking rod 168. The first joint portion 170 and second joint portion 172 can be respectively connected to a first pivot connector 174 and a second pivot connector 176.

The first pivot connector 174 can have an opening 178 into which the second pivot connector 176 can be positioned and through which the first and second portions 171, 173 of the linking rod 168 can extend. In some embodiments, the first pivot connector 174 can have a fork-like shape with a top portion 180 and a bottom portion 182 respectively positioned above and below the second pivot connector 176 (i.e., on opposite sides of the opening 178). The first and second pivot connectors 174, 176 can rotate relative to each other about vertical axis 122 in the manner shown in FIGS. 6A-6B. A top fastener 184 and bottom fastener 186 can join the first and second pivot connectors 174, 176 along the vertical axis 122, thereby preventing the first and second pivot connectors 174, 176 from being laterally pulled apart from each other.

A set of bushings 188 can be positioned between the first and second pivot connectors 174, 176 and the fasteners 184, 186 to allow sliding relative movement of the first and second pivot connectors 174, 176 and the first pivot connector 174 and the fasteners 184, 186 while the fasteners 184, 186 are affixed to (and not pivotable relative to) the second pivot connector 176. The bushings 188 can comprise a size and material composition configured to provide a predetermined amount of friction to the joint 120. For example, the bushings 188 can comprise brass, nylon, or other common materials for joint bushings in order to ensure that joint 120 movement is smooth, reversible, and neither requiring too much nor too force little to change the angle between the first and second pivot connectors 174, 176. The friction at the bushings 188 can be controlled by tightening or loosening the top fastener 184, such as, for example, by advancing it downward or upward relative to the second pivot connector 176.

A biased washer 190 or similar compression-biased structure such as a compression spring, Belleville washer, or "wavy washer" can be positioned between the top fastener 184 and the bushings 188 or the first pivot connector 174, and the biased washer 190 can increase the magnitude of a normal force between the first and second pivot connectors 174, 176 at the bushings 188 that provide friction surfaces between those connectors 174, 176. Accordingly, the amount of frictional resistance to pivoting the joint 120 can be controlled by the set of bushings 188 and the position of the top fastener 184 relative to the second pivot connector 176. The friction preload on the joint 120 can be controlled independent of the rigidity of the coupling by adjusting pressure on the biased washer 190, changing the biased washer 190 for a different one, or removing it.

The first and second pivot connectors 174, 176 can each have central openings through which the first and second portions 171, 173 of the linking rod 168 can extend and connect to each other at a universal joint 192. The universal joint 192 can move without contacting the first and second pivot connectors 174, 176 or the fasteners 184, 186. The universal joint 192 can transfer axial rotation of the first portion 171 into axial rotation of the second portion 173 at any rotated angle between the first and second portions 171, 173 and at a ratio of about 1:1. Accordingly, the universal joint 192 within joint 120 can transfer rotation in a manner wherein rotation of the first portion 171 (e.g., as caused by rotation of a handle 116 connected thereto) can cause equal rotation of the second portion 173. This can be beneficial to synchronize the vertical movement of the support bar 106 at each leg 102, 104 using the rack and pinion features at the carriage assemblies. See FIGS. 3, 10, and 11 and their related descriptions herein.

The display stand 100 can have no support pillars underneath the joint 120 and can be free-floating relative to a support surface below the display stand 100 at the ends of the segments 124, 126 of the support bar 106 that are coupled to each other at first and second pivot connectors 174, 176. This can beneficially allow the space between the legs 102, 104 to be open and to take up less room on a support surface. The support surface can therefore have more space for input devices, computers, and related components connected to the displays 112.

The linking rod 168 can comprise shaft joints 194 as shown in FIGS. 3, 4, 6A, 6B, 8, and 9. Each shaft joint 194 can be a position at which a portion (e.g., second portion 173) of the linking rod 168 is connected to another portion thereof (e.g., third portion 175 in FIG. 8). In this example embodiment, the second portion 173 can be referred to as a middle portion since it extends from the shaft joint 194 to the middle of the linking rod 168, and the third portion 175 can be referred to as an end portion since it extends from the shaft joint 194 to the outer end of the linking rod 168 at the handle 116.

The middle portion and end portion can be attached to each other by a pair of fasteners 196. As shown in the section view of FIG. 9 (which is an isometric section view taken through section lines 9-9 in FIG. 8), the fasteners 196 can extend through the middle and end portions. Accordingly, axial rotation of the middle portion is synchronized with axial rotation of the end portion. Using two fasteners 196 can help prevent the middle and end portions from rotating relative to each other about an axis extending parallel to a longitudinal axis of a fastener 196 (e.g., axis F in FIG. 9).

Figure 9:
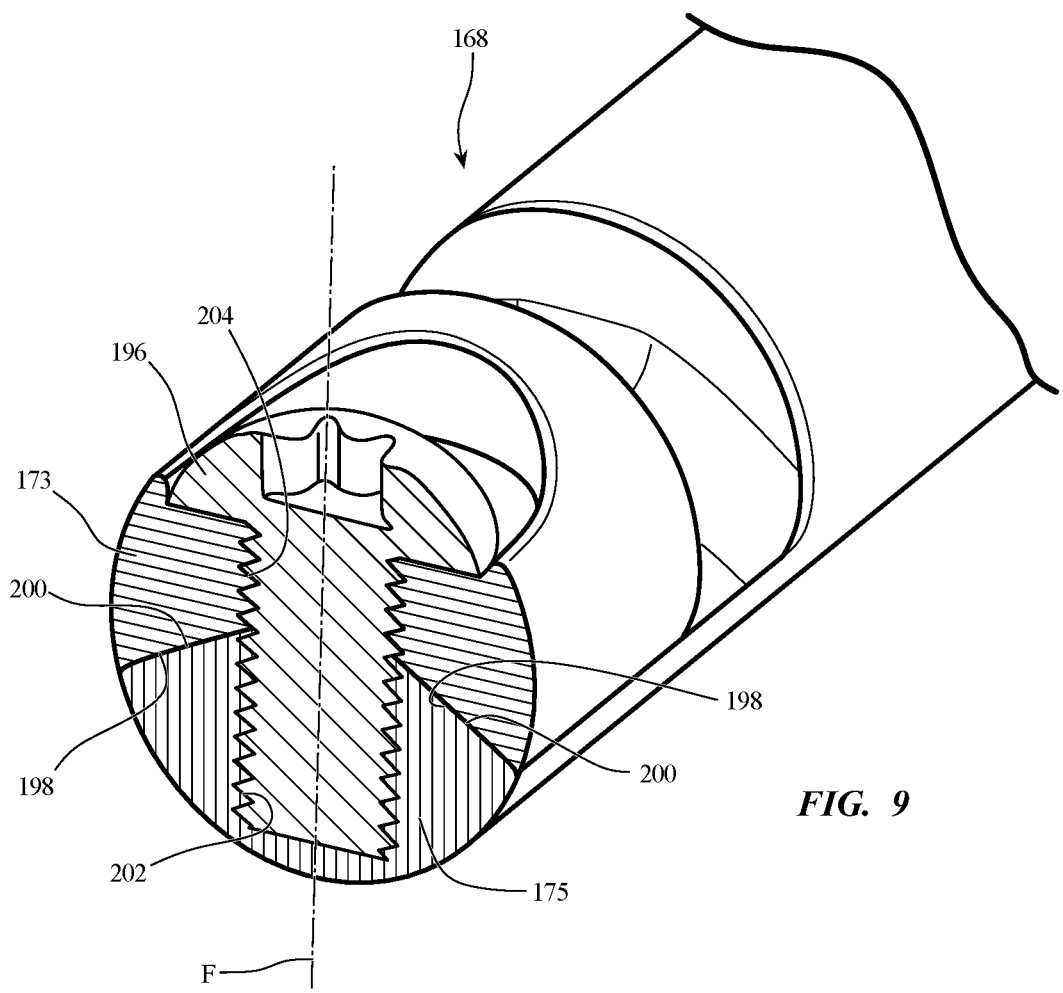
FIG. 9 is an isometric section view of the shaft joint as taken through section lines 9-9 in FIG. 8.

The end of the middle portion of the linking rod 168 can comprise an inverted V-shaped recess having two downward-facing sloped surfaces 198, and the end portion of the linking rod 168 can comprise a corresponding V-shaped surface with two upward-facing sloped surfaces 200. The sloped surfaces 198, 200 can contact each other when the middle portion and end portion are fastened together by the fasteners 196. The angle between each of the downward-facing sloped surfaces 198 and the angle between each of the upward-facing sloped surfaces 200 can be substantially equal to each other to provide a mating fit as shown in FIG. 9. In some embodiments, the angle is about 120 degrees. The mating contact of those surfaces 198, 200 can keep the middle portion and end portion from moving relative to each other in a plane perpendicular to the longitudinal axis of the linking rod 168 or from rotating about an axis perpendicular to the longitudinal axis of the linking rod 168. The mating contact between the surfaces 198, 200 can also be radially self-aligning. The surfaces 198, 200 can be formed by machining the middle and end portions of the linking rod 168.

When assembling the linking rod 168, the sloped surfaces 198, 200 can be placed in contact with each other before the fasteners 196 are applied, and the fasteners 196 can then be positioned through openings 202, 204 in the middle and end portions. See FIGS. 9 and 13A. The middle portion and end portion of the linking rod 168 can each comprise two openings 202/204. At least one pair of openings 202, 204 can have an elongated longitudinal dimension rather than being circular to receive the fasteners 196. See FIG. 13A. In some embodiments, the elongation is about one millimeter greater than the diameter of the fasteners 196. For this reason, the axial positions of the middle and end portions (i.e., 173, 175)

can be longitudinally tuned. Fasteners 196 can be applied to keep the middle and end portions held together in a first position, or the fasteners 196 can be loosened and can slide between different longitudinal positions (within the elongated openings 202 or 204) to lengthen or shorten the overall length of the linking rod 168.

Accordingly, moving the fasteners along the elongated openings can adjust and tune axial misalignment (i.e., improper length) of the linking rod 168 in order to ensure smooth operation of the handle 116 and universal joint 192 despite variation of the manufactured length of the linking rod 168. Assembling the linking rod 168 rather than using a single-piece linking rod 168 can also be beneficial for streamlining manufacturing and allowing easier adjustment or maintenance of the display stand 100 after manufacturing. The fasteners 196 can also be accessed through the lateral slots 128 in the support bar 106 for adjustment of the linking rod 168 after assembly of the display stand 100.

Figure 13A:
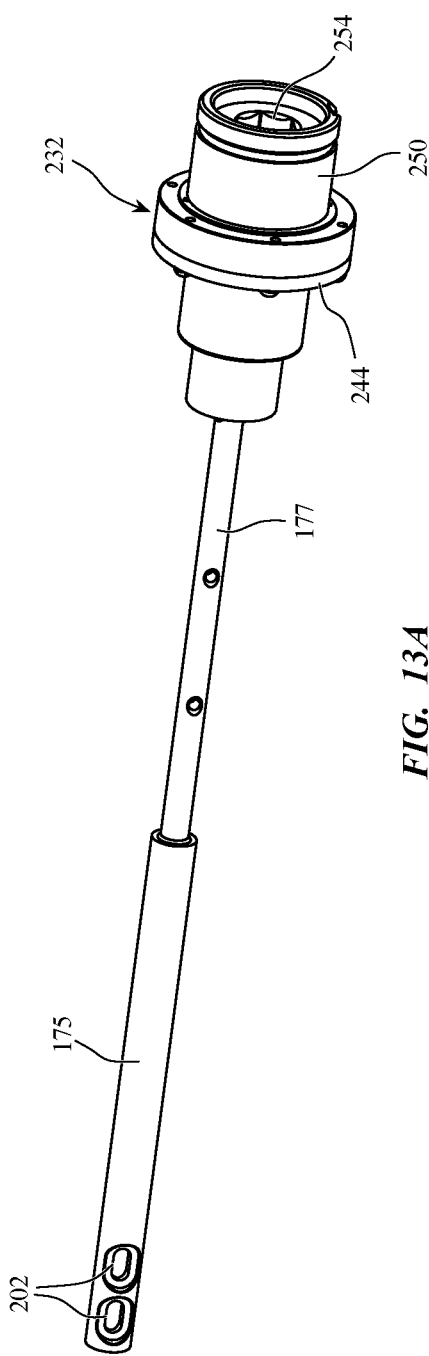
FIG. 13A is an isometric view of a clutch and linking rod.

In some embodiments, the second and third portions 173, 175 can also have equal overall diameters adjacent to the shaft joint 194. The fasteners 196 can be recessed into at least one of the second or third portions 173, 175 in order to ensure that application of the fasteners 196 do not increase the overall diameter of the linking rod 168 at the shaft joint 194. An example set of recesses is shown in FIG. 13A and around the heads of the fasteners 196 in FIGS. 8 and 9. The maximum overall diameter of the linking rod 168 can therefore be sufficiently small enough to pass through the inner channel 166 of the shuttle 108 without contacting the shuttle body 140. Accordingly, the shuttle 108 can move longitudinally across the shaft joint 194 without interfering with operation of (or contact between) the shuttle 108 or linking rod 168. The shaft joints 194 can have high coupling strength in a small volume, and their coupling strength can be independent of the surface finish of the linking rod 168.

The first and second legs 102, 104 can each comprise a carriage assembly. One carriage assembly 206 is shown within second leg 104 in FIGS. 3 and 11, and a similar carriage assembly (e.g., one that is a mirror image across axis 122) can be included in the first leg 102. The carriage assembly 206 can include an energy storage device 208, a bearing 210, and a rack 212.

The energy storage device 208 can comprise a spring (e.g., a gas spring, elastic coil spring, power spring, torsion spring, or constant force spring) or other energy storage structure configured to store energy and to act as a counterbalance for the movement of the weight of the support bar 106, shuttles 108, support arms 110, displays 112, and other movable components of the display stand 100. The energy storage device 208 can therefore be configured to store potential energy as the support bar 106 moves downward (i.e., as the support bar 106 and attached components lose potential energy) and can be configured to release potential energy as the support bar 106 moves upward. In this manner, movement of the support bar 106 can require reduced force input as compared to moving the entire support bar 106 without counterbalance assistance. The energy storage device 208 can be attached to a vertically translatable portion 214 of the bearing 210.

Figure 11:
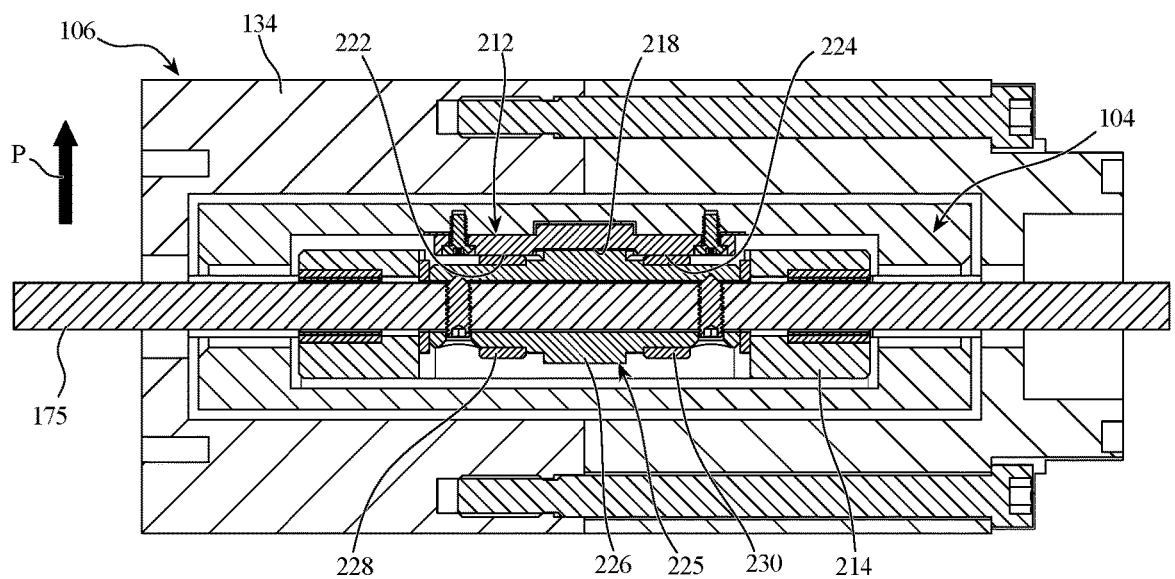
FIG. 11 is a section view of a leg, linking rod, and support bar as taken through section lines 11-11 in FIG. 3.

The vertically translatable portion 214 of the bearing 210 can be vertically translatable along a vertical axis through the leg 104 relative to a static portion 216 of the bearing 210 attached to the leg 104. See FIGS. 3 and 11. FIG. 11 is a top end section view taken through the leg 104 and support bar 106 as indicated by section lines 11-11 in FIG. 3. The vertically translatable portion 214 can be attached to the tubular body 134 that surrounds the leg 104, and the vertically translatable portion 214 can therefore move with the support bar 106. The bearing 210 can be configured to prevent movement and rotation of the vertically translatable portion 214 except along the vertical direction (i.e., along axis V in FIG. 3).

Figure 10:
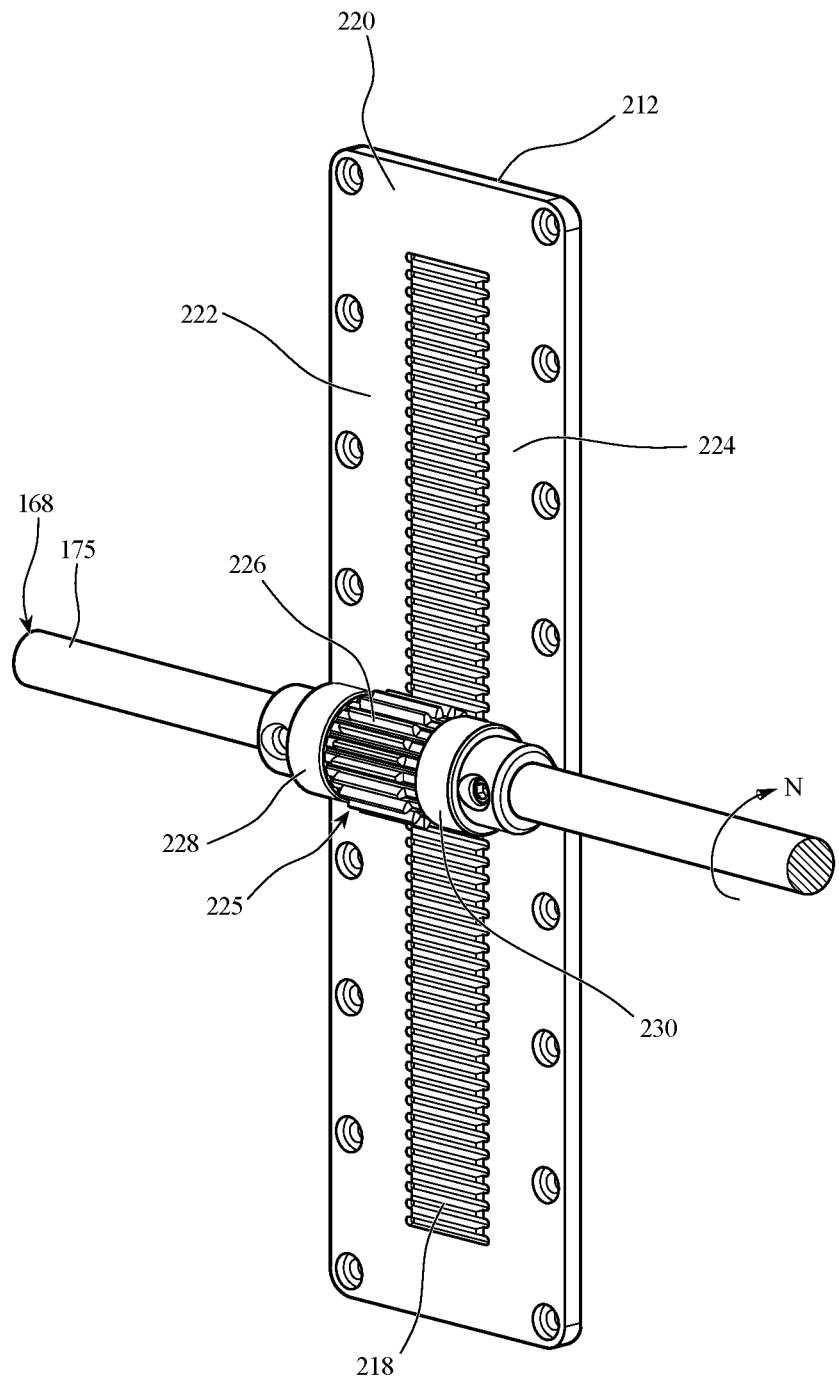
FIG. 10 is an isometric view of a rack, pinion, and linking rod.

As shown in FIGS. 10-11, the rack 212 can comprise a set of gear teeth 218 formed within and extending across a portion of a planar surface 220. Each lateral side of the planar surface 220 can be a flat and smooth shoulder 222, 224 lacking protrusions or recesses. The rack 212 can be positioned on a rear-facing surface of the leg 104 (i.e., a surface facing away from the lateral slots 128 and generally configured to face away from the displays 112). Thus, the planar surface 220 can be a rear-facing surface.

The rack 212 can be engaged by a pinion 225 which is coaxial with and located on (or integrally part of) the end portion/third portion 175 of the linking rod 168. The pinion 225 can comprise a gear surface comprising teeth 226 sized and shaped to engage and enmesh with the teeth 218 of the rack 212. The pinion 225 can also have two laterally adjacent shoulder surfaces 228, 230 configured to engage and roll against the smooth shoulders 222, 224 of the rack 212. The shoulder surfaces 228, 230 can be an integral part of the pinion body in which the teeth 226 are formed or can be positioned on separate parts that are combined with or assembled onto the pinion 225.

Rotational movement of the pinion 225 can drive vertical movement of the linking rod 168 at each end of the linking rod 168 due to the pinions 225 at each end of the linking rod 168, as shown in FIGS. 6A-6B. The vertical movement of the linking rod 168 as it rotates can also induce vertical movement of the support bar 106 as a whole due to simultaneous movement of the vertically translatable portion 214 of the bearing 210 of the carriage assembly 206. Accordingly, application of an input moment N to the linking rod 168 (see FIG. 10) can cause vertical translation of the entire support bar 106.

When the support bar 106 is loaded with the weight of the displays 112, their weight can pull forward on the legs 102, 104 in direction P in FIG. 11. The pinion 225 can also be pulled into the rack 212 parallel to direction P. While this force is applied, the gear teeth 218, 226 can be prevented from overmeshing or undermeshing by the engagement of the rack 212 and pinion 225 being limited by contact between the shoulder surfaces 228, 230 and the smooth shoulders 222, 224. The diameter of the shoulder surfaces 228, 230 can be equal to a pitch diameter of the mesh of the rack 212 and pinion 225, and the smooth shoulders 222, 224 can be set to the pitch height or pitch diameter of the mesh as well. Accordingly, as the shoulder surfaces 228, 230 roll against the smooth shoulders 222, 224, the distance between the gear teeth 218, 226 can be limited by the mechanical contact between the shoulder surfaces 228, 230 and the smooth shoulders 222, 224. Furthermore, because the shoulder surfaces 228, 230 are pulled against the smooth shoulders 222, 224 by the weight of the displays 112, they can always be at the proper distance from each other to limit slippage or binding of the gear teeth 218, 226 that can be caused by over- or undermeshing.

Figure 12:
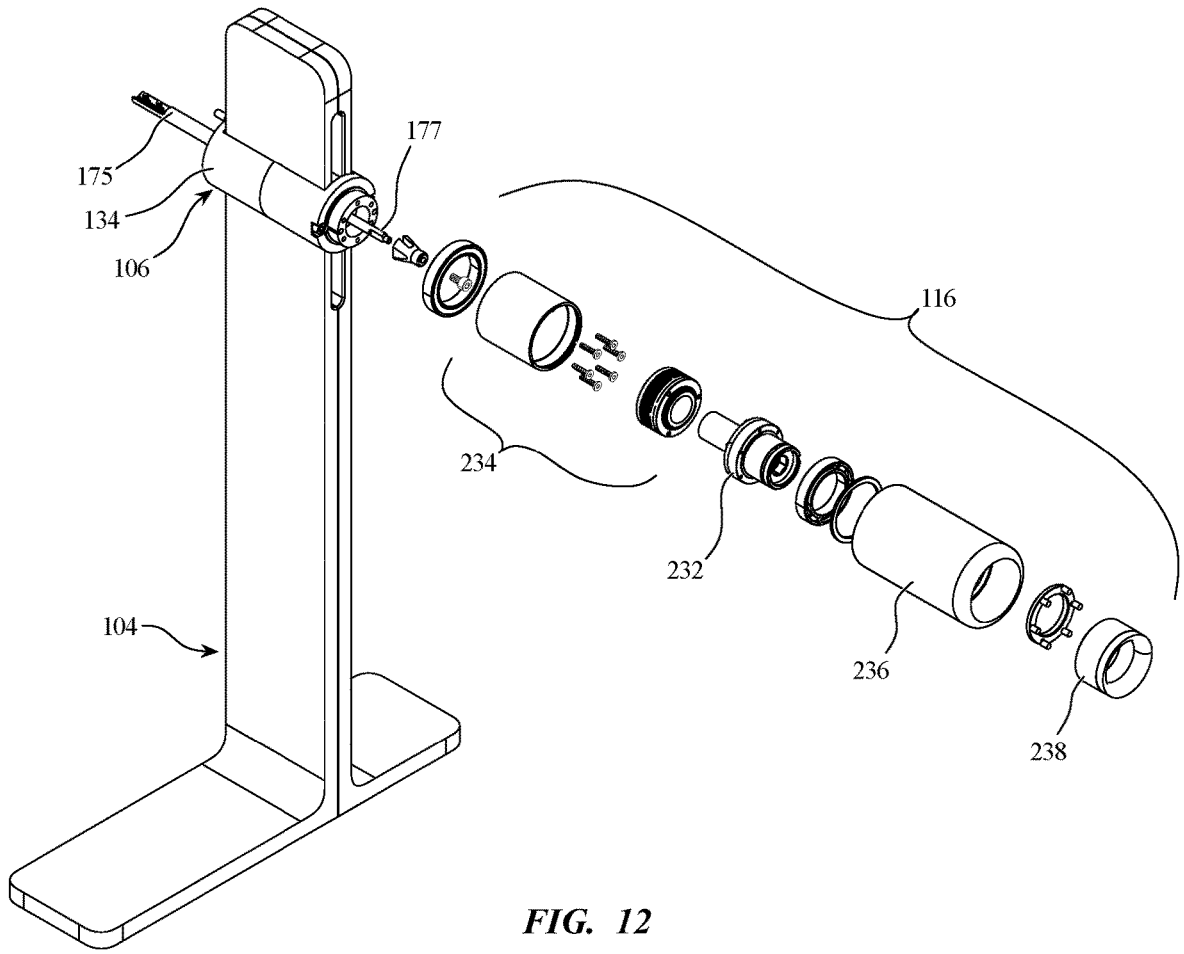
FIG. 12 is an exploded isometric view of a handle and leg of the display stand.
Figure 13B:
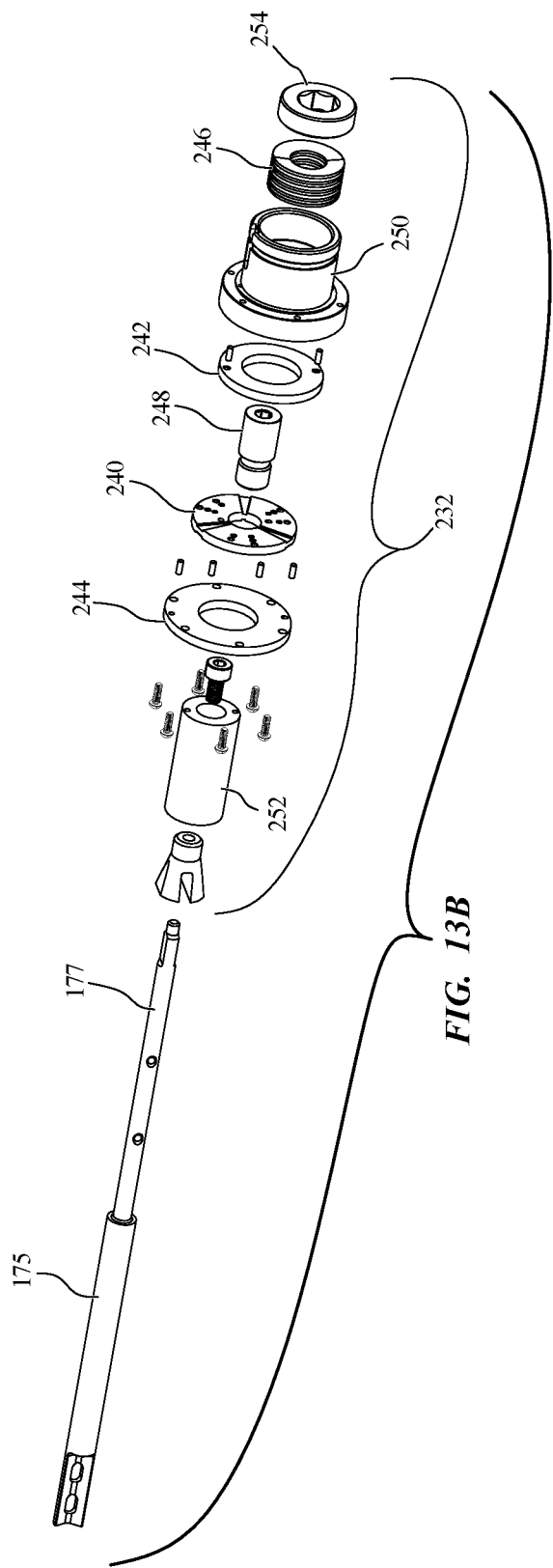
FIG. 13B is an isometric exploded view of the clutch and linking rod of FIG. 13A.

As shown in FIG. 12, a handle 116 can be attached to a terminal end 177 of the linking rod 168. A similar handle 116 can be attached to the opposite terminal end of the linking rod 168, as shown in FIG. 1. A handle 116 can comprise a clutch 232 and a friction engine 234 positioned within a shell 236 and cap 238. FIGS. 13A-13B respectively show an isometric view and an exploded view of the clutch 232, FIGS. 14A-14B respectively show an isometric view and an exploded view of the friction engine 234, and FIG. 15 shows a side central cross-section of the display stand 100 at the handle 116 as taken through section lines 15-15 in FIG. 1. The handles 116 can support ambidextrous input, wherein operating a handle 116 on either end of the support bar 106 can raise or lower the support bar 106.

The clutch 232 can be used to prevent torque applied to the shell 236 of the handle 116 from over-torqueing the linking rod 168. For example, the clutch 232 can slip when the top or bottom of the range travel of the support bar 106 is reached and the user continues to apply a torque to respectively move the bar upward or downward. Similarly, the clutch 232 can slip when opposite handles 116 are sufficiently torqued in opposite directions.

As shown in FIGS. 13B and 15, the clutch 232 can comprise a rotor 240, a floating plate 242, and a backing plate 244 that are all axially aligned. The floating plate 242 can contact the outer side of the rotor 240, and the backing plate 244 can contact the inner side thereof. The clutch 232 can also include a set of biasing devices 246 to apply a biasing force to the floating plate 242 and, in turn, to the rotor 240. The biasing devices 246 can be springs such as, for example, Belleville springs or elastically compressible washers. The rotor 240 can be fixed to a shaft 248 that is fixed to the third end 177 of the linking rod 168 via a bearing 252. The rotor 240, shaft 248, and linking rod 168 can be fixed relative to each other and can therefore have their axial rotation synchronized.

The floating and backing plates 242, 244 can frictionally engage opposite sides of the rotor 240, and the carrier 250 can be fixed to the backing plate 244. Accordingly, rotation of the carrier 250 can be synchronized with rotation of the backing plate 244 and rotor 240 insofar as the force of the frictional engagement between the backing plate 244 and rotor 240 is not overcome. For example, when a low input torque (along arrow H in FIG. 1) is applied to the carrier 250 via the shell 236, the entire clutch 232 can axially rotate with the linking rod 168. As the input torque increases, a threshold torque can be reached wherein the torque overcomes the frictional engagement between the rotor 240 and the backing plate 244 and therefore causes the rotor 240 to slip relative to the backing plate 244. As a result, the input torque does not cause rotation of the linking rod 168. The clutch 232 can therefore be referred to as a slip clutch.

The threshold input torque can be dependent upon the magnitude of the force applied by the biasing devices 246 to the floating plate 242. Accordingly, the threshold input torque can be controlled by longitudinal adjustment of a friction preload screw 254 that compresses, or allows the biasing devices 246 to expand, relative to the floating plate 242. The clutch 232 can therefore limit over-torqueing the linking rod 168 while transferring torque below a threshold torque value that can safely rotate the linking rod 168 and can thereby adjust the vertical position of support bar 106 using the carriage assembly 206.

Figure 14A:
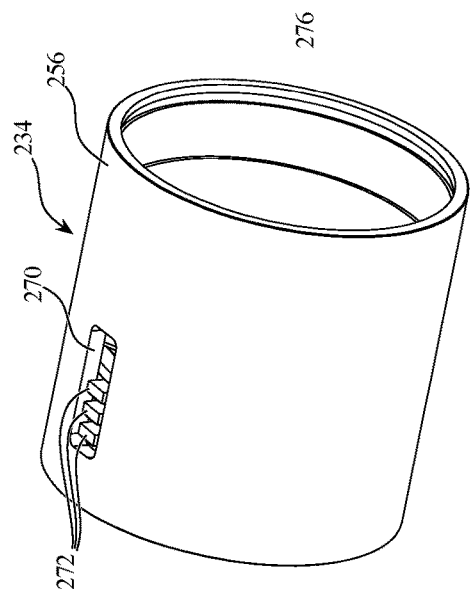
FIG. 14A is an isometric view of a friction engine.
Figure 14B:
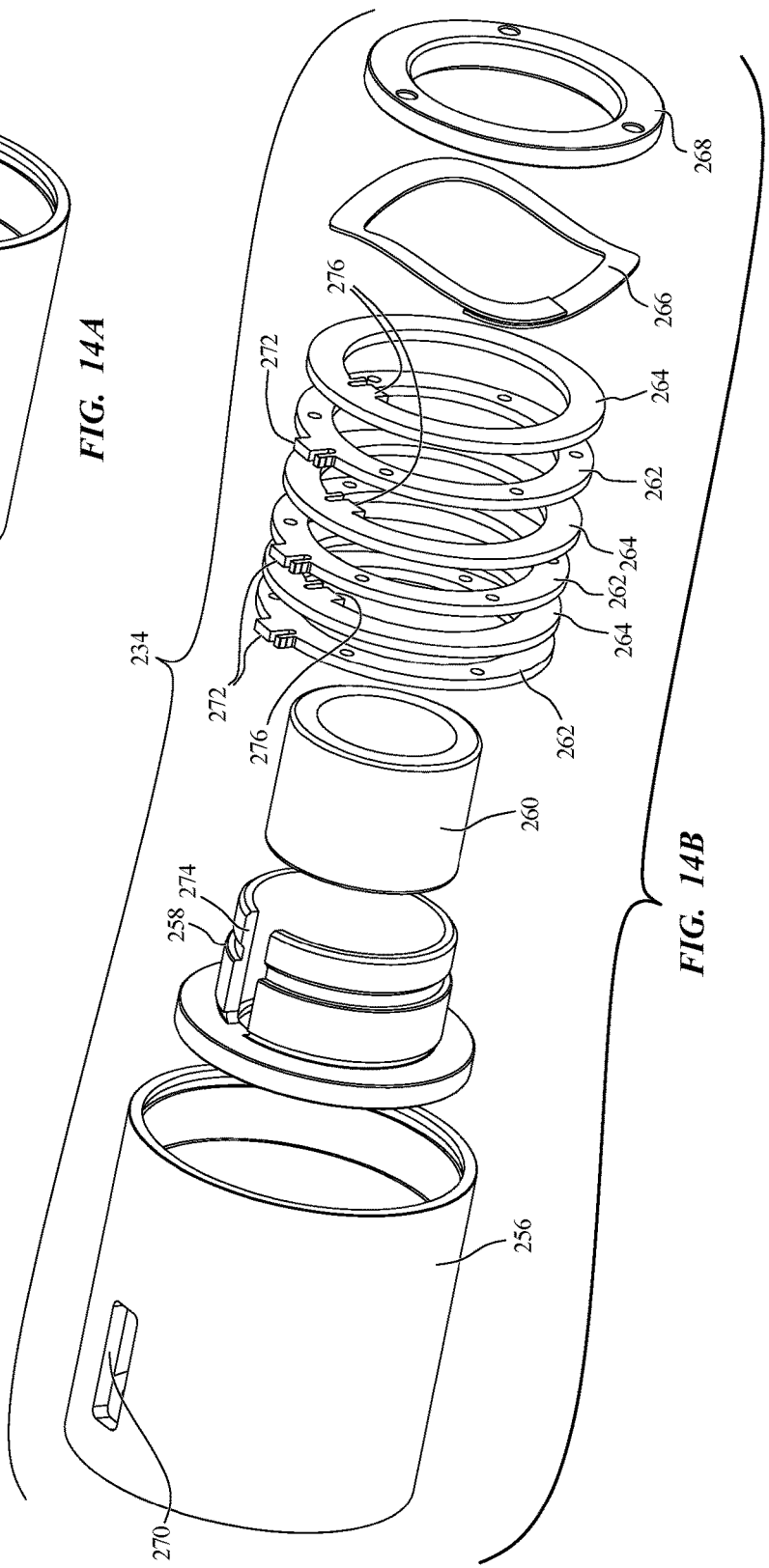
FIG. 14B is an isometric exploded view of the friction engine of FIG. 14A.
Figure 15:
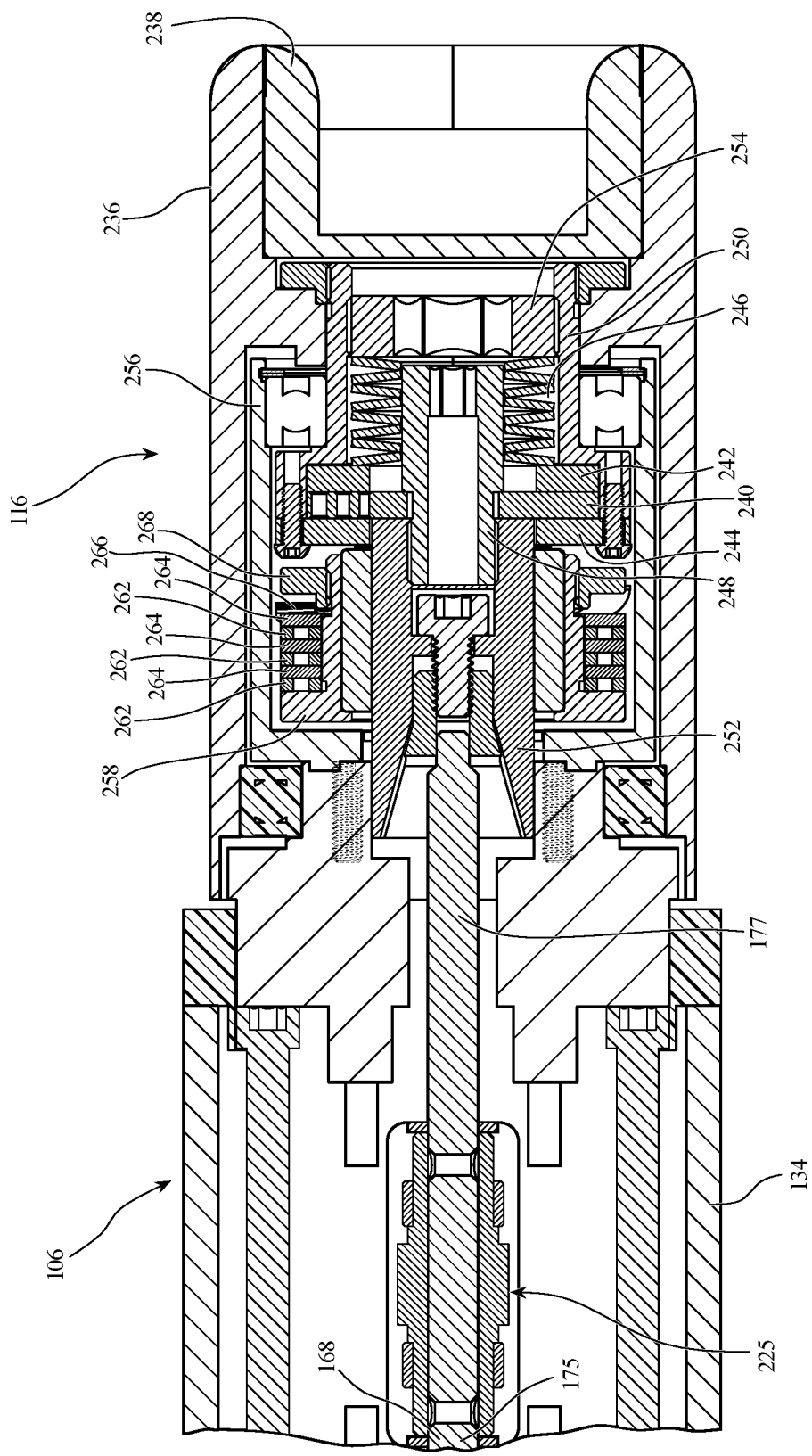
FIG. 15 is a section view of the handle, linking rod, and support bar as taken through section lines 15-15 in FIG. 1.

As shown in FIGS. 14A-14B, the friction engine 234 can include an outer carrier 256, inner carrier 258, a bearing 260, a first set of plates 262, a second set of plates 264, a biasing device 266, and a retaining collar 268. The outer carrier 256 can comprise a plate protrusion retainer opening 270 in which plate protrusions 272 of the first set of plates 262 can be positioned (see FIG. 14A). The inner carrier 258 can have a plate protrusion retainer opening 274 to receive plate protrusions 276 of the second set of plates 264. See FIG. 14B. The radially-outward-extending plate protrusions 272 of the first set of plates 262 can synchronize axial rotation of the first set of plates 262 with rotation of the outer carrier 256. The radially-inward-extending plate protrusions 276 of the second set of plates 264 can synchronize axial rotation of the second set of plates 264 with the rotation of the inner carrier 258. The biasing device 266 can apply a biasing force that urges the first and second sets of plates 262, 264 into frictional engagement with each other. The retaining collar 268 can hold the biasing device 266 in place.

Axial rotation of the inner carrier 258 and second set of plates 264 can be synchronized with axial rotation of the bearing 252 and linking rod 168. Axial rotation of the outer carrier 256 can be synchronized with rotation of the shell 236. The outer carrier 256 and first set of plates 262 can rotate independent of the inner carrier 258, subject to overcoming friction between the first and second sets of plates 262, 264. Accordingly, a predetermined minimum input torque must be applied to the shell 236 in order to induce slippage between the first and second sets of plates 262, 264.

In some embodiments, the bearing 260 can be a one-way locking needle roller bearing. Thus, when rotating the handle 116 to move the support bar 106 upward, the bearing 260 can allow free rotation of the inner bearing 252. Thus, the friction between the first and second sets of plates 262, 264 can be reduced or eliminated. In a static hang configuration (i.e., rotation to move the support bar 106 downward), the bearing 260 can lock relative to the inner bearing 252, and the second set of plates 264 can be held stationary by friction relative to the first set of plates 262. This can provide a reaction torque to the hanging weight of the displays 112 and support bar 106.

The friction engine 234 can therefore provide a friction-based minimum threshold for rotational movement of the handle 116, and, accordingly, can also provide a friction-based minimum threshold for vertical movement of the support bar 106. This friction-based minimum threshold can help make upward and downward movement of the support bar 106 require more similar amounts of input torque for movement in either direction as compared to a handle 116 only supported by the counterbalance of the energy storage device 208 (i.e., a gas spring). The clutch 232 and friction engine 234 can be independently adjusted respectively using the preload screw 254 and retaining collar 268.

Figure 16:
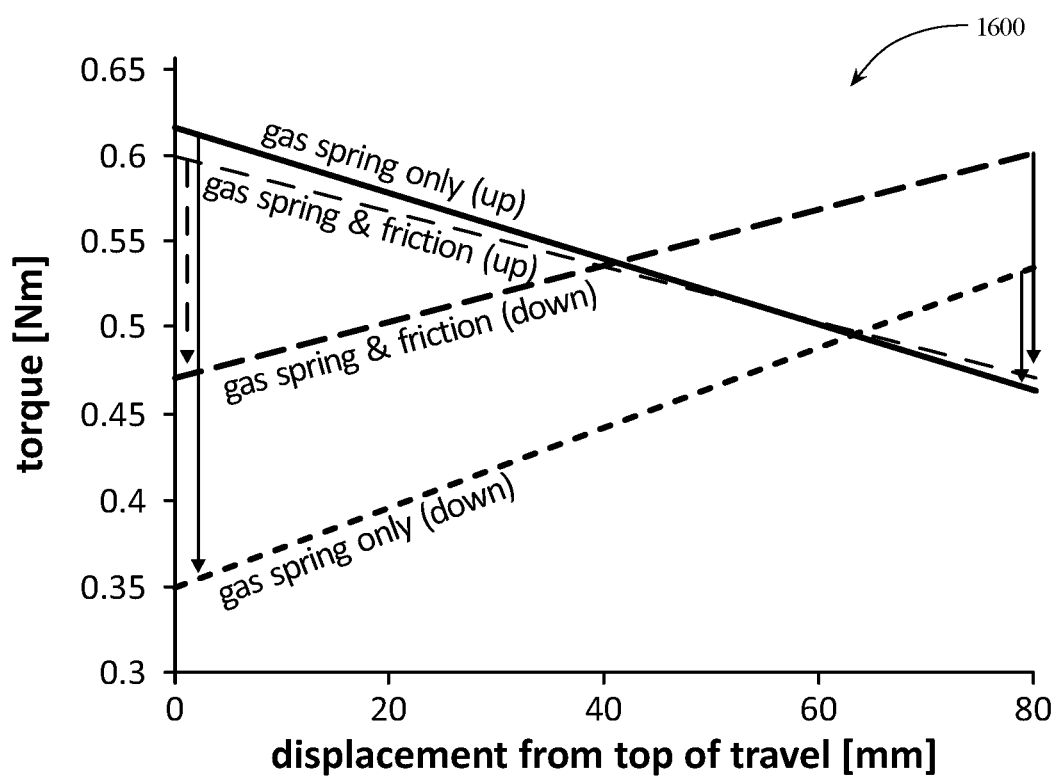
FIG. 16 is a plot of torque versus displacement for embodiments of a handle, linking rod, and carriage assembly having a gas spring and/or friction engine.

As shown in the chart 1600 of FIG. 16, when the friction engine 234 is used, the input torque required to start displacing the support bar 106 downward from the top of the range of its possible vertical travel can be between about 0.45 and 0.5 Newton-meters. As the support bar 106 travels downward, the input torque required can increase to about 0.6 Newton-meters upon reaching about 80 millimeters of downward displacement. When moving the support bar 106 upward from an 80-millimeter displacement position, the input torque can be between about 0.45 and 0.5 Newton-meters, and as the support bar 106 travels upward, the input torque can increase to between about 0.6 to about 0.65 Newton-meters.

By comparison, when the friction engine 234 is not used, and only the carriage assembly 206 is used for counterbalancing the support bar 106, the torque required to displace downward from zero downward displacement is about 0.35 Newton-meters and gradually increases to between about 0.5 to about 0.55 Newton-meters at 80 millimeters of downward displacement. Moving the support bar 106 upward requires between about 0.45 and about 0.5 Newton-meters of torque at 80 millimeters of downward displacement that gradually increases to about 0.6 Newton-meters of torque at zero downward displacement.

Accordingly, at zero downward displacement, there is an about 0.25 to about 0.3 Newton-meter difference between moving the support bar 106 upward versus moving it downward when only the carriage assembly 206 is used. With the friction engine 234 being used, the difference is between about 0.1 and about 0.15 Newton-meters. Therefore, a user rotating the handle 116 does not feel as large of a difference between the torque required to move the support bar 106 upward versus downward when the friction engine is used. At 80 millimeter displacement, there is a larger difference between moving the friction engine-enhanced support bar 106 upward and downward as compared to an embodiment without the friction engine 234, but the difference between upward and downward motion with the friction engine at 80 mm is very similar in the difference at zero millimeters (i.e., about 0.1-0.15 Nm). For this reason, a handle 116 using the friction engine 234 can feel more consistent with respect to how much torque is required to move the support bar 106 whether the support bar 106 is at a low position (e.g., 80 mm in FIG. 16) or a high position (e.g., 0 mm in FIG. 16).

This behavior can be provided because the friction engine 234 can resist vertical movement of the support bar 106. Accordingly, a portion of the weight of the support bar 106 is supported by the friction engine 234, and the energy storage device 208 does not need to store as much potential energy to help counterbalance and move the support bar 106. The energy storage device 208 can therefore have a lower energy storage capacity or rating, which generally means the energy storage device 208 can be smaller in size, quieter, and easier to use in the leg 104.

Additionally, in various configurations, the display stand 100 can use two displays 112, one display 112, or no displays. The energy storage device 208 therefore must be configured to counterbalance movement of the support bar 106 under multiple different loading conditions. The friction engine 234 can provide consistent support for the weight of the support bar 106 irrespective of the number of displays 112 held by the support bar 106 and can therefore give more similar torque profiles (as shown in FIG. 16) for those different loading conditions. The user can be required to give an on-average higher, but more consistent, input torque to move the support bar 106 under various loading conditions.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A display support assembly, comprising:
   a first stand leg;
   a first carriage assembly positioned on the first stand leg;
   a second stand leg;
   a second carriage assembly positioned on the second stand leg;
   a display support bar connected to the first carriage assembly and to the second carriage assembly, the display support bar extending from a first vertical position on the first stand leg to a second vertical position on the second stand leg, the display support bar comprising:
     a first segment;
     a second segment; and
     a pivotable joint rotatable about a vertical pivot axis and including a fastener joining the first and second segments;
     wherein a first longitudinal axis of the first segment and a second longitudinal axis of the second segment are configurable in an angled configuration with the first longitudinal axis and the second longitudinal axis extending from the pivotable joint in a non-coaxial configuration;
   a carriage adjuster to simultaneously adjust the first and second vertical positions of the display support bar relative to the first and second stand legs by adjusting the first carriage assembly and the second carriage assembly when the display support bar is in the angled configuration and with the fastener being aligned with the vertical pivot axis.

2. The display support assembly of claim 1, further comprising a display support arm mounted to the display support bar at a mounting position relative to the first stand leg, wherein the mounting position is adjustable relative to the first stand leg in a vertical direction, and in a horizontal direction, and about the vertical pivot axis at the pivotable joint.

3. The display support assembly of claim 1, wherein the carriage adjuster is rotatable about at least one of the first or second longitudinal axis of the display support bar.

4. The display support assembly of claim 1, wherein the carriage adjuster is positioned at an end of the display support bar.

5. The display support assembly of claim 1, wherein the carriage adjuster comprises a first carriage adjuster positioned at a first end of the display support bar and a second carriage adjuster positioned at a second end of the display support bar.

6. The display support assembly of claim 1, wherein the first carriage assembly comprises a rack and pinion adjustable by the carriage adjuster.

7. The display support assembly of claim 1, further comprising a support arm extending from the display support bar.

8. The display support assembly of claim 7, further comprising a shuttle movable along an axis of the display support bar, the support arm being movable with the shuttle.

9. The display support assembly of claim 8, further comprising a rotatable shaft linked to the carriage adjuster, the rotatable shaft extending through the shuttle.

10. The display support assembly of claim 8, wherein the display support bar comprises a first rail surface and a second rail surface, and wherein the shuttle comprises a first wheel in contact with the first rail surface and a second wheel in contact with the second rail surface.

11. The display support assembly of claim 1, wherein the display support bar comprises a first portion, a second portion, the pivotable joint joining the first and second portions.

12. The display support assembly of claim 11, further comprising a universal joint positioned in the pivotable joint.

13. A display stand for an electronic device, comprising:
    a vertical support base;
    a support bar vertically movable relative to the vertical support base, the support bar being configured to mount to an electronic display;
    a first handle to adjust a position of the support bar relative to the vertical support base between an extreme raised position and an extreme lowered position, the first handle having a first slip clutch; and
    a second handle to adjust a position of the support bar relative to the vertical support base between the extreme raised position and the extreme lowered position, the second handle having a second slip clutch;
    wherein when the support bar is positioned between the extreme raised position and the extreme lowered position, rotation of the first handle or the second handle raises or lowers the support bar relative to the vertical support base; and
    wherein when the first handle and the second handle are torqued in opposite directions, at least one of the first slip clutch and the second slip clutch slips.

14. The display stand of claim 13, wherein the first handle is coaxial with the support bar.

15. The display stand of claim 13, wherein the first slip clutch slips upon application of a torque to the first handle exceeding a predetermined maximum torque.

16. The display stand of claim 13, wherein the first slip clutch comprises a disk contacted by a biased pressure plate.

17. The display stand of claim 13, wherein the support bar comprises an adjustment shaft, wherein rotation of the adjustment shaft adjusts the position of the support bar between the two extreme raised and lowered positions, wherein the first handle comprises a friction engine coupled with the adjustment shaft, the friction engine applying a first amount of friction to the adjustment shaft as the handle adjusts the position of the support bar in an upward direction and applying a second amount of friction to the adjustment shaft as the first handle adjusts the position of the support bar in a downward direction, the first amount of friction being less than the second amount of friction.

18. The display stand of claim 13, wherein rotation of the first handle adjusts a pinion relative to a rack.

19. The display stand of claim 18, wherein the pinion comprises a shoulder surface having a diameter equal to a pitch diameter of the pinion.

20. The display support assembly of claim 1, wherein the pivotable joint comprises a range of deflection up to 40 degrees.

21. A display support assembly, comprising:
a first stand leg;
a first carriage assembly positioned on the first stand leg;
a second stand leg;
a second carriage assembly positioned on the second stand leg;
a display support bar connected to the first carriage assembly and to the second carriage assembly, the display support bar extending from a first vertical position on the first stand leg to a second vertical position on the second stand leg, the display support bar comprising a pivotable joint configured to position the display support bar in an angled configuration with a first longitudinal axis of the display support bar and a second longitudinal axis of the display support bar extending from the pivotable joint in a non-coaxial configuration;
a carriage adjuster to simultaneously adjust the first and second vertical positions of the display support bar relative to the first and second stand legs by adjusting the first carriage assembly and the second carriage assembly when the display support bar is in the angled configuration; and
a display support arm mounted to the display support bar at a mounting position, wherein the mounting position is adjustable relative to the first stand leg in a vertical direction, in a horizontal direction, and about a vertical axis of rotation at the pivotable joint.

22. A display stand for an electronic device, comprising:
a vertical support base;
a support bar vertically movable relative to the vertical support base, the support bar being configured to mount to an electronic display;
a handle to adjust a position of the support bar relative to the vertical support base between an extreme raised position and an extreme lowered position, the handle having a slip clutch;
wherein when the support bar is positioned between the extreme raised position and the extreme lowered position, rotation of the handle raises or lowers the support bar relative to the vertical support base;
wherein when the support bar is positioned at the extreme raised position, rotation of the handle slips the slip clutch; and
wherein when the support bar is positioned at the extreme lowered position, rotation of the handle slips the slip clutch; and
wherein the support bar comprises an adjustment shaft, wherein rotation of the adjustment shaft adjusts the position of the support bar between the two extreme raised and lowered positions, wherein the handle comprises a friction engine coupled with the adjustment shaft, the friction engine applying a first amount of friction to the adjustment shaft as the handle adjusts the position of the support bar in an upward direction and applying a second amount of friction to the adjustment shaft as the handle adjusts the position of the support bar in a downward direction, the first amount of friction being less than the second amount of friction.

\* \* \* \* \*